United States Patent
Park et al.

(10) Patent No.: US 10,635,261 B2
(45) Date of Patent: Apr. 28, 2020

(54) MOBILE TERMINAL AND CONTROLLING METHOD THEREOF

(71) Applicant: LG Electronics Inc., Seoul (KR)

(72) Inventors: Chala Park, Seoul (KR); Jaeuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 639 days.

(21) Appl. No.: 15/017,368

(22) Filed: Feb. 5, 2016

(65) Prior Publication Data

US 2017/0075516 A1 Mar. 16, 2017

(30) Foreign Application Priority Data

Sep. 11, 2015 (KR) .......................... 10-2015-0128784

(51) Int. Cl.
| | |
|---|---|
| *G06F 3/0482* | (2013.01) |
| *G06F 3/0481* | (2013.01) |
| *H04N 21/478* | (2011.01) |
| *H04N 21/472* | (2011.01) |
| *H04N 21/482* | (2011.01) |

(Continued)

(52) U.S. Cl.
CPC ........ *G06F 3/0482* (2013.01); *G06F 3/04817* (2013.01); *G06F 3/04842* (2013.01); *G06F 3/04883* (2013.01); *H04M 1/72583* (2013.01); *H04N 21/4126* (2013.01);
(Continued)

(58) Field of Classification Search
CPC ...... H04N 21/466; H04N 21/45; H04N 21/44; H04N 21/43; H04N 21/47; H04N 21/48; H04N 21/41; H04N 21/42; G06F 15/16; G06F 3/04812; G06F 3/0484; G06F 3/0488
See application file for complete search history.

(56) References Cited

U.S. PATENT DOCUMENTS 7,711,605 B1 *  5/2010  Santeufemia ...... G06Q 30/0621
                                                   705/26.5
9,304,765 B1 *  4/2016  Volchegursky .......... G06F 8/35
(Continued)

FOREIGN PATENT DOCUMENTS

| CN | 103813209 A | 5/2014 |
| EP | 2874401 A1 | 5/2015 |

*Primary Examiner* — Steven P Sax
(74) *Attorney, Agent, or Firm* — Birch, Stewart, Kolasch & Birch, LLP

(57) ABSTRACT

A mobile terminal including a wireless communication processor configured to receive at least one of first information on a viewing history of a content and second information on at least one application saved in a memory of a preset external display device; a memory configured to store at least one of a preset application, the first information and the second information; a display configured to display an execution screen of the preset application; and a controller configured to display an icon of the at least one application on the execution screen based on the second information, display at least one of a recent content list run on a specific application corresponding to a specific icon and a recommended content list on a prescribed region of the execution screen based on at least one of the first information and the second information, in response to a first touch input to the specific icon among icons of the at least one or more applications.

18 Claims, 24 Drawing Sheets

(51) Int. Cl.
*H04N 21/41* (2011.01)
*H04N 21/422* (2011.01)
*G06F 3/0484* (2013.01)
*G06F 3/0488* (2013.01)
*H04M 1/725* (2006.01)

(52) U.S. Cl.
CPC ..... *H04N 21/42224* (2013.01); *H04N 21/478* (2013.01); *H04N 21/47202* (2013.01); *H04N 21/4826* (2013.01)

(56) References Cited

U.S. PATENT DOCUMENTS

| | | | |
|---|---|---|---|
| 9,459,759 B2* | 10/2016 | Son | G06Q 10/10 |
| 9,778,816 B2* | 10/2017 | Ryu | G06F 11/3438 |
| 2006/0271618 A1* | 11/2006 | Kokubo | H04M 1/72522 |
| | | | 709/202 |
| 2008/0244640 A1* | 10/2008 | Belleguie | H04N 7/165 |
| | | | 725/35 |
| 2009/0167497 A1* | 7/2009 | Kim | H04L 63/0492 |
| | | | 340/10.1 |
| 2009/0327892 A1* | 12/2009 | Douillet | H04L 12/2812 |
| | | | 715/717 |
| 2010/0302059 A1* | 12/2010 | Hnatiuk | G06F 3/04817 |
| | | | 340/12.54 |
| 2011/0191611 A1* | 8/2011 | boni ang gaw go | G06F 1/32 |
| | | | 713/320 |
| 2011/0283314 A1* | 11/2011 | Tang | H04N 21/4143 |
| | | | 725/37 |
| 2012/0054278 A1* | 3/2012 | Taleb | G06Q 50/01 |
| | | | 709/204 |
| 2012/0140255 A1* | 6/2012 | Tanaka | G06F 9/445 |
| | | | 358/1.13 |
| 2012/0169768 A1* | 7/2012 | Roth | G06F 3/0486 |
| | | | 345/629 |
| 2012/0236201 A1* | 9/2012 | Larsen | G06Q 10/10 |
| | | | 348/468 |
| 2012/0272185 A1* | 10/2012 | Dodson | H04N 21/4828 |
| | | | 715/810 |
| 2013/0018960 A1* | 1/2013 | Knysz | G06Q 50/01 |
| | | | 709/204 |
| 2013/0080907 A1 | 3/2013 | Skelton et al. | |
| 2013/0339991 A1* | 12/2013 | Ricci | H04N 21/44204 |
| | | | 725/14 |
| 2014/0049691 A1* | 2/2014 | Burdzinski | H04N 21/25883 |
| | | | 348/563 |
| 2014/0091912 A1* | 4/2014 | Lazarro | G08C 19/00 |
| | | | 340/12.52 |
| 2014/0149931 A1* | 5/2014 | Miki | G06F 9/451 |
| | | | 715/803 |
| 2014/0164957 A1* | 6/2014 | Shin | G06F 3/0482 |
| | | | 715/753 |
| 2014/0164966 A1* | 6/2014 | Kim | G06F 3/0486 |
| | | | 715/769 |
| 2014/0188766 A1* | 7/2014 | Waldman | G06Q 30/0283 |
| | | | 705/400 |
| 2014/0194164 A1* | 7/2014 | Lee | G06F 3/0485 |
| | | | 455/566 |
| 2014/0337729 A1* | 11/2014 | Jang | G06F 3/0484 |
| | | | 715/716 |
| 2014/0359584 A1* | 12/2014 | Chu | G06F 9/5072 |
| | | | 717/131 |
| 2014/0365969 A1* | 12/2014 | Lee | G06F 3/0482 |
| | | | 715/834 |
| 2015/0007233 A1* | 1/2015 | Earle | H04N 21/4622 |
| | | | 725/44 |
| 2015/0033184 A1 | 1/2015 | Kim et al. | |
| 2015/0120767 A1* | 4/2015 | Skeen | G06F 16/335 |
| | | | 707/754 |
| 2015/0143423 A1* | 5/2015 | Park | G06F 3/041 |
| | | | 725/40 |
| 2015/0172764 A1* | 6/2015 | Chae | H04N 21/4668 |
| | | | 725/9 |
| 2015/0189383 A1* | 7/2015 | Saijo | H04N 21/4668 |
| | | | 725/14 |
| 2015/0195474 A1* | 7/2015 | Lu | G08C 17/02 |
| | | | 348/552 |
| 2015/0289024 A1* | 10/2015 | Yoon | H04L 67/02 |
| | | | 725/40 |
| 2016/0012853 A1* | 1/2016 | Cabanilla | H04W 4/21 |
| | | | 386/241 |
| 2016/0065529 A1* | 3/2016 | Katayama | G06F 3/0481 |
| | | | 715/752 |
| 2016/0142743 A1* | 5/2016 | Nielsen | H04N 21/2358 |
| | | | 725/54 |
| 2016/0361492 A1* | 12/2016 | Nunez | A61M 16/0003 |
| 2016/0373804 A1* | 12/2016 | Iyer | G06F 3/0488 |
| 2017/0083177 A1* | 3/2017 | Kitada | G06F 3/04842 |
| 2017/0153809 A1* | 6/2017 | Yang | G06F 3/0484 |

* cited by examiner

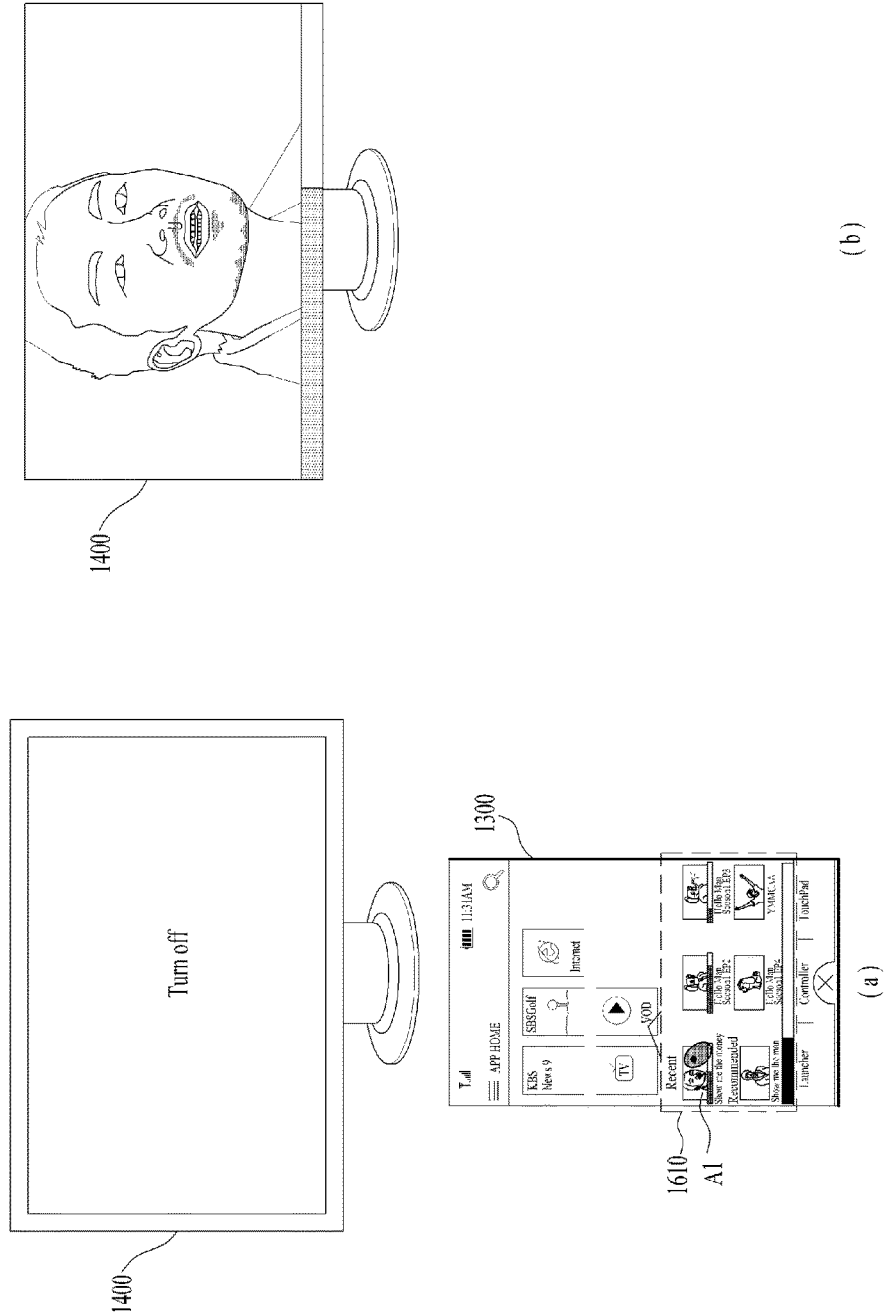

MOBILE TERMINAL AND CONTROLLING METHOD THEREOF

Pursuant to 35 U.S.C. § 119(a), this application claims the benefit of earlier filing date and right of priority to Korean Application No. 10-2015-0128784, filed on Sep. 11, 2015, the contents of which are hereby incorporated by reference herein in their entirety.

BACKGROUND OF THE INVENTION

Field of the Invention

The present invention relates to a multimedia device and a method for controlling the same.

Discussion of the Related Art

In succession to standing device, such as PC (Personal Computer), TV (Television), and so on, the evolution of mobile devices, such as smart phones, Tablet PCs, and so on, is remarkable. Although standing devices and mobile devices have initially been evolving in each of their respective fields by being differentiated from one another, such fields have become non-distinctive with the recent advent of the digital convergence boom.

Recently, a display device frequently tends to be controlled through a specific application (e.g., a remote controller application) saved in a memory of a mobile terminal (e.g., a smartphone, etc.). A current technology can display/provide a list of applications installed on a WebOS platform located display device on/to a mobile terminal in the same manner of the display device. Although the application installed on the display device can be run in the mobile terminal using the remote controller application, since an existing viewing history and an existing job history are not provided to the mobile terminal, it is inconvenient for a user to select previously viewed contents by moving personally to an input device screen appropriate for the corresponding application.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which user's viewing and control histories saved in a display device can be saved to a mobile terminal capable of controlling the display device.

Another object of the present invention is to provide a mobile terminal and controlling method thereof, by which continuity and convenience of user's experience can be secured by facilitating user's viewing of a viewing-interrupted content by saving user's viewing and control histories saved in a display device to a mobile terminal.

Another object of the present invention is to provide a mobile terminal and controlling method thereof, by which a list of applications runnable in a display device can be provided using a remote controller application saved in a memory of a mobile terminal as well as a recently viewed content can be guided.

Further object of the present invention is to provide a mobile terminal and controlling method thereof, by which user's convenience can be secured by changing an execution screen of a remote controller application saved in a mobile terminal into a configuration for facilitating user's control of a display device in accordance with a type of a content currently displayed on a display device.

Technical tasks obtainable from the present invention are non-limited by the above-mentioned technical tasks. In addition, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal capable of connecting a communication with a preset external display device according to one embodiment of the present invention may include a communication unit configured to receive at least one of first information on a viewing history of a content and second information on at least one application saved in a memory of the preset external display device from the communication-connected preset external display device, a memory storing at least one selected from the group consisting of a preset application, the first information and the second information, a display unit configured to display an execution screen of the preset application, and a controller controlling the display unit to display an icon of the at least one application on the execution screen based on the second information, the controller controlling the display unit to display at least one of a recent content list run on a specific application corresponding to a specific icon and a recommended content list on a prescribed region of the execution screen based on at least one of the first information and the second information in response to first touch input to the specific icon among icons of the at least one or more applications.

In another aspect of the present invention, as embodied and broadly described herein, a method of controlling a mobile terminal capable of connecting a communication with a preset external display device according to another embodiment of the present invention may include the steps of displaying an execution screen of a preset application saved in a memory, receiving at least one of first information on a viewing history of a content and second information on at least one application saved in a memory of the preset external display device from the communication-connected preset external display device, saving at least one the first information and the second information to the memory, displaying an icon of the at least one application on the execution screen based on the second information, and displaying at least one of a recent content list run on a specific application corresponding to a specific icon and a recommended content list on a prescribed region of the execution screen based on at least one of the first information and the second information in response to first touch input to the specific icon among icons of the at least one or more applications.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Effects obtainable from the present invention may be non-limited by the above mentioned effect. In addition, other unmentioned effects can be clearly understood from the following description by those having ordinary skill in the technical field to which the present invention pertains. Both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 25 is a diagram illustrating another example of a method of controlling a specific content to be displayed on a communication-connected preset external display device using a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
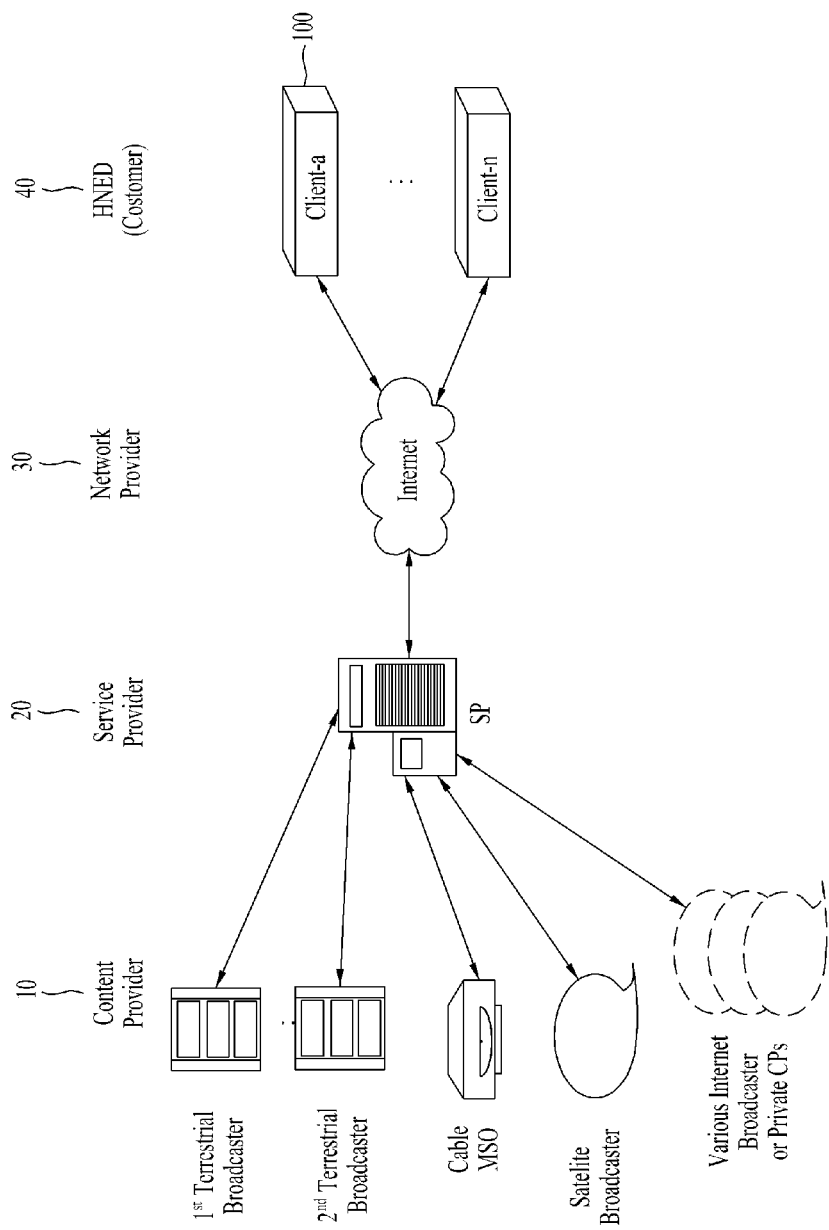
FIG. 1 is a schematic diagram illustrating a service system including a digital device according to one embodiment of the present invention.

In the following description, various embodiments according to an embodiment of the present invention are explained with reference to attached drawings. In particular, FIG. 1 illustrates a broadcast system including a digital receiver according to an embodiment of the present invention. Referring to FIG. 1, examples of a broadcast system comprising a digital receiver may include a content provider (CP) 10, a service provider (SP) 20, a network provider (NP) 30, and a home network end user (HNED) (Customer) 40. The HNED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include first or second terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users. The SP 20 can provide services to the client 100 in a uni-cast or multi-cast manner. The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment. The client 100 can construct a home network and transmit/receive data.

The server can use and request a content protection means such as conditional access. In this instance, the client 100 can use a means such as a cable card or downloadable CAS (DCAS), which corresponds to the content protection means of the server. In addition, the client 100 can use an interactive service through a network. In this instance, the client 100 can directly serve as the CP 10 and/or the SP 20 in a relationship with another client or indirectly function as a server of the other client.

Figure 2:
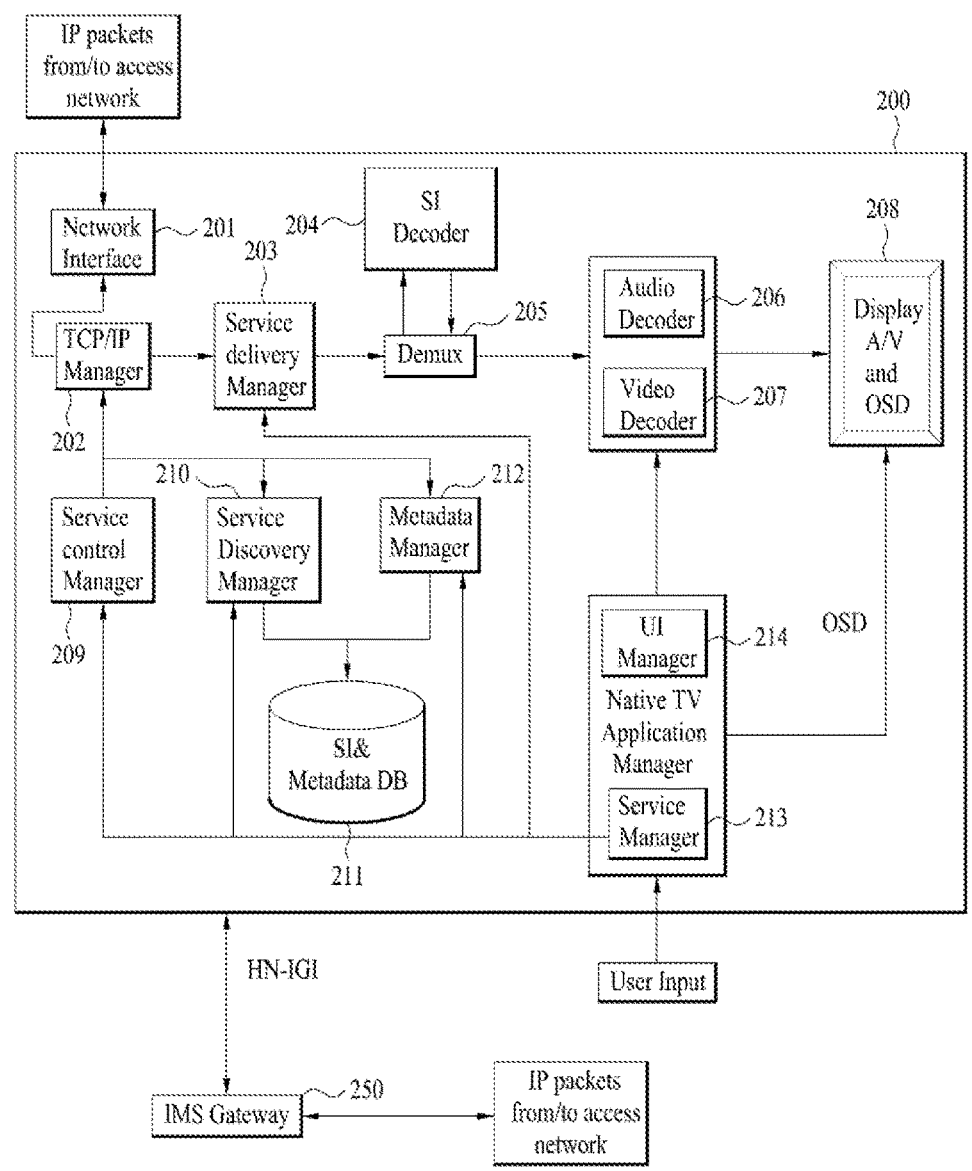
FIG. 2 is a block diagram showing a digital device according to one embodiment of the present invention.

FIG. 2 is a schematic diagram of a digital receiver 200 according to an embodiment of the present invention. The digital receiver 200 may correspond to the client 100 shown in FIG. 1. The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted based on the RTP, according to the RTP and transmits the parsed data packet to the demultiplexer 205 or store the parsed data packet in the SI & metadata DB 211 under the control of the service manager 213. The service delivery manager 203 can feed back network reception information to the server based on the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc. The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208. The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD. The service manager 213 may control and manage service-related managers such as the service delivery manager 203, the service discovery manager 210, the service control manager 209, and the metadata manager 212.

The service manager 213 may configure a channel map and enable channel control at the request of the user based on the channel map. The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this instance, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process based on a position variation of the first result. In this instance, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result based on the coordinate information and perform the second process based on the position of the first result.

The service discovery manager 210 may provide information required to select a service provider that provides a service. Upon receipt of a signal for selecting a channel from the service manager 213, the service discovery manager 210 discovers a service based on the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211. The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data. An IMS (IP Multimedia Subsystem) gateway 250 may include functions required to access an IMS based IPTV services.

Figure 3:
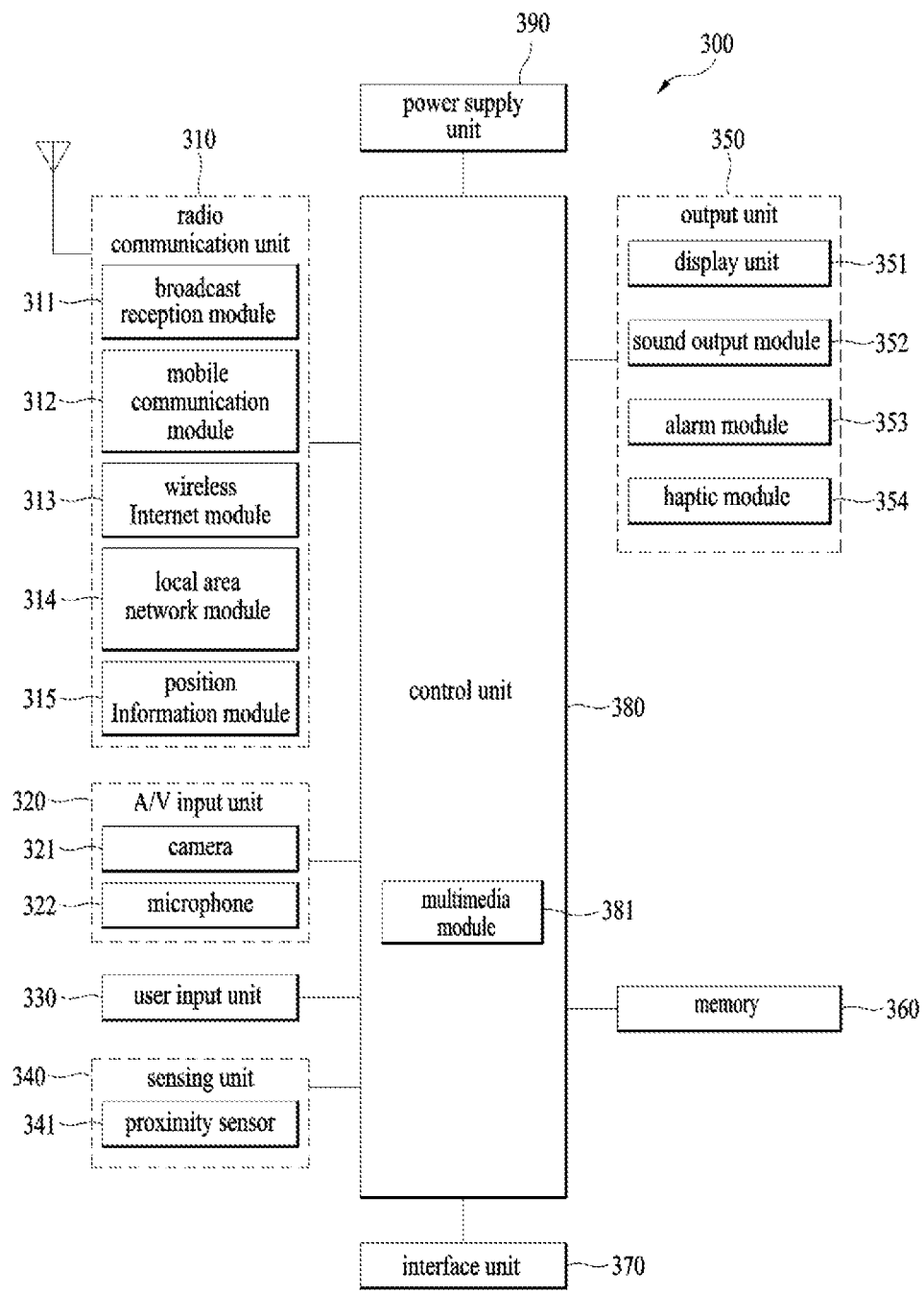
FIG. 3 is a block diagram showing the configuration of a digital device according to another embodiment of the present invention.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, a user input unit 330, a sensing unit 340, an output unit 350, a memory 360, an interface unit 370, a controller 380, and a power supply unit 390. FIG. 3 shows the mobile terminal 300 having various components, but Implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this instance, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360. The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this instance, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. In addition, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence.

The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 can perform a pattern (or image) recognizing process for recognizing a writing input and a picture drawing input performed on the touch screen as characters or images, respectively. The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
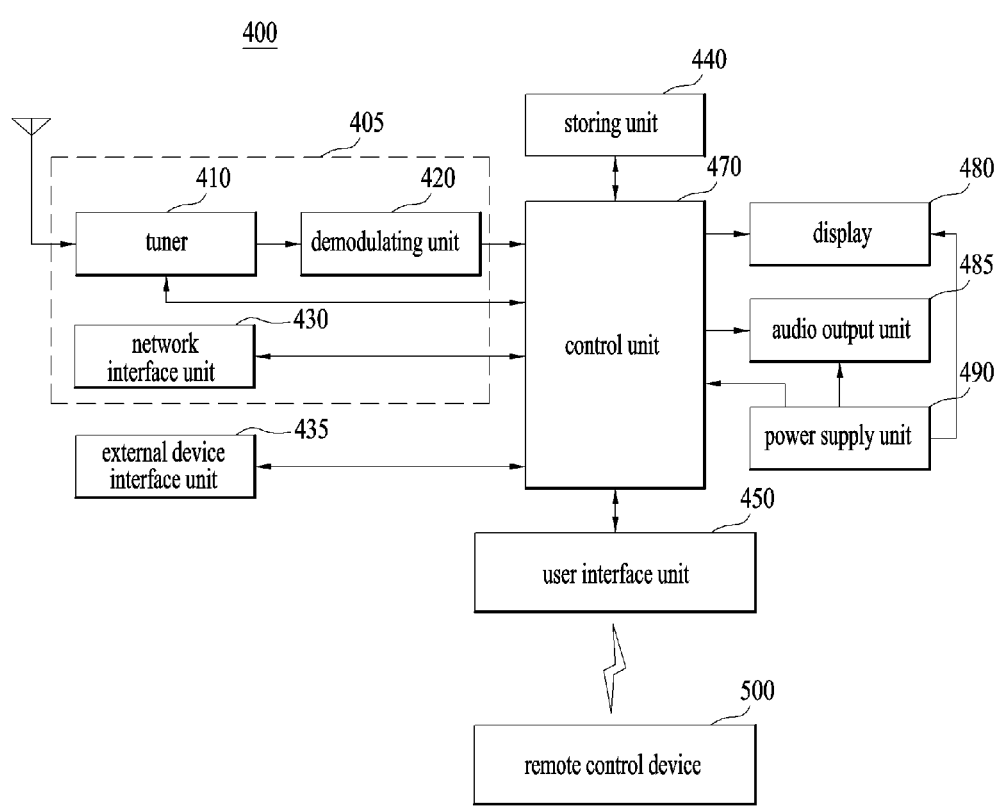
FIG. 4 is a diagram showing a digital device according to another embodiment of the present invention.

FIG. 4 illustrates a digital receiver according to another embodiment of the present invention. Referring to FIG. 4, an exemplary digital receiver 400 according to an embodiment of the present invention may include a broadcast receiving unit 405, an external device interface 435, a storage unit 440, a user input interface 450, a controller 470, a display unit 480, an audio output unit 485, a power supply unit 490, and a photographing unit. The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer to multiplex a signal, which is subjected to the tuner 410 and demodulated by the demodulator 420, and a signal received through the network interface 40. In addition, the broadcast receiving unit 405 can include a demultiplexer and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels. The demodulator 420 may receive a digital IF (Intermediate Frequency) signal (DIF) converted by the tuner 410 and demodulate the DIF signal.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit or an RF communication unit. The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital receiver 400 to wired/wireless networks. Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network. The storage unit 440 may store programs for signal processing and control and store a processed video, audio or data signal. In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user. For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key of a set value to the controller 470. The user input interface 450 can transmit a control signal input from a sensing unit which senses a gesture of the user or deliver a signal of the controller 470 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals. A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435. The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel. The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected. The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor which generates a thumbnail image corresponding to a channel signal or an external input signal. The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit for sensing a gesture of the user, which includes at least one of a touch sensor, a voice sensor, a position sensor, and an action sensor, as described above. A signal sensed by the sensing unit can be delivered to the controller 470 through the user input interface 450. The digital receiver 400 may further include the photographing unit for photographing the user. Image information acquired by the photographing unit can be supplied to the controller 470. The controller 470 may sense a gesture of the user from an image captured by the photographing unit or a signal sensed by the sensing unit, or by combining the image and the signal.

The power supply unit 490 may supply power to the digital receiver 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth, RF communication, IR communication, UWB, ZigBee, etc. In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified illustrating embodiments of the present invention and detailed operations or devices do not limit the scope of the present invention. Some of the components shown in FIG. 2 may be omitted or a component (not shown in FIG. 2) may be added as required. The digital receiver according to an embodiment of the present invention may not include the tuner and the demodulator, differently from the digital receivers shown in FIGS. 2 and 4, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 5:
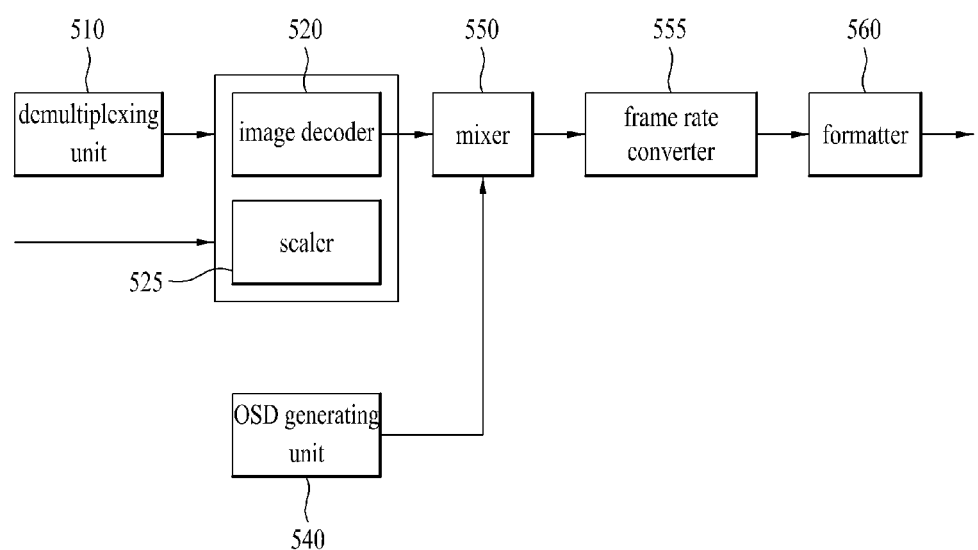
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 and 3. The digital receiver according to an embodiment of the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example. The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550. The OSD generator 540 may generate OSD data automatically or according to user input. For example, the OSD generator 540 may generate data to be displayed on the screen of an output unit in the form of an image or text based on a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this instance, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals. Furthermore, the audio processor can control base, treble and volume.

In addition, a data processor can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Figure 6:
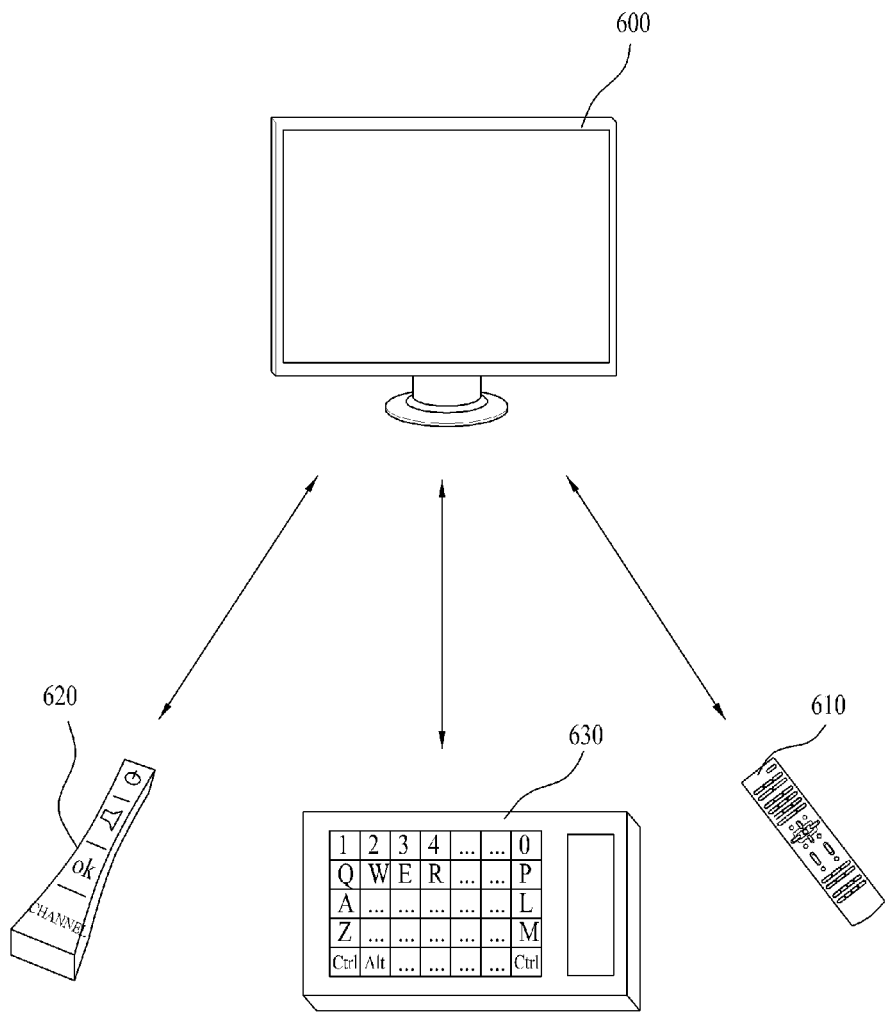
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention. To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc. UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu. The remote controller 630 including the keyboard and touch pad can facilitate text input through the keyboard and control of movement of a pointer and magnification and reduction of a picture or video through the touch pad.

The digital device described in the present specification can be operated by based on WebOS platform. Hereinafter, a WebOS based process or algorithm may be performed by the controller of the above-described digital device. The controller includes the controllers of FIGS. 2 to 5 and has wide concepts. Accordingly, hereinafter, a component for processing WebOS based services, applications, content, etc., including software, firmware or hardware in a digital device is referred to a controller.

Such a WebOS based platform may improve development independency and functional extensibility by integrating services, applications, etc. based on a Luna-service bus, for example, and increase application development productivity based on web application framework. In addition, system resources, etc. may be efficiently used via a WebOS process and resource management to support multitasking.

A WebOS platform described in the present specification may be available or loaded not only for stationary devices such as personal computers (PCs), TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
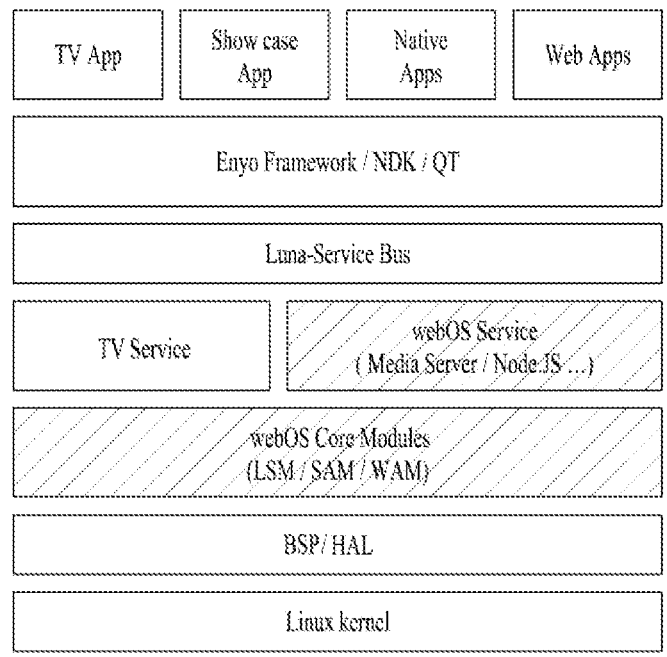
FIG. 7 is a diagram illustrating WebOS architecture according to one embodiment of the present invention.

FIG. 7 is a diagram illustrating WebOS architecture according to one embodiment of the present invention. The architecture of a WebOS platform will now be described with reference to FIG. 7. The platform may be largely divided into a kernel, a WebOS core platform based on a system library, an application, a service, etc.

The architecture of the WebOS platform has a layered structure. OS is provided at a lowest layer, system library(s) are provided at a next highest layer and applications are provided at the highest layer. First, the lowest layer is an OS layer including a Linux kernel such that Linux is included as an OS of the digital device.

At layers higher than the OS layer, a board support package (BSP)/hardware abstraction layer (HAL) layer, a WebOS core modules layer, a service layer, a Luna-service bus layer and an Enyo framework/native developer's kit (NDK)/QT layer are sequentially provided. At the highest layer, an application layer is provided.

One or more layers of the above-described WebOS layered structure may be omitted and a plurality of layers may be combined to one layer and one layer may be divided into a plurality of layers. The WebOS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications. The WAM is based on Enyo framework, because a WebOS regards a web application as a basic application. An application may use a service via a Luna-service bus. A service may be newly registered via a bus and the application may detect and use a desired service.

The service layer may include services having various service levels, such as a TV service, a WebOS service, etc. The WebOS service may include a media server, Node.JS, etc. In addition, in particular, the Node.JS service supports JavaScript, for example. The WebOS service may be communicated to a Linux process implementing function logic via a bus. This WebOS service is largely divided into four parts, migrates from a TV process and an existing TV to a WebOS, is developed as services which differ between manufacturers, WebOS common services and Javascripts, and is composed of the Node.JS service used via Node.JS.

The application layer may include all applications supportable by a digital device, such as a TV application, a showcase application, a native application, a web application, etc. Applications on the WebOS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the WebOS platform, such as card view, home dashboard, virtual keyboard, etc. QML is a markup language of a script format, not C++. The native application is an application which is developed and compiled using C/C++ and is executed in the binary form and has an advantage such as high execution speed.

Figure 8:
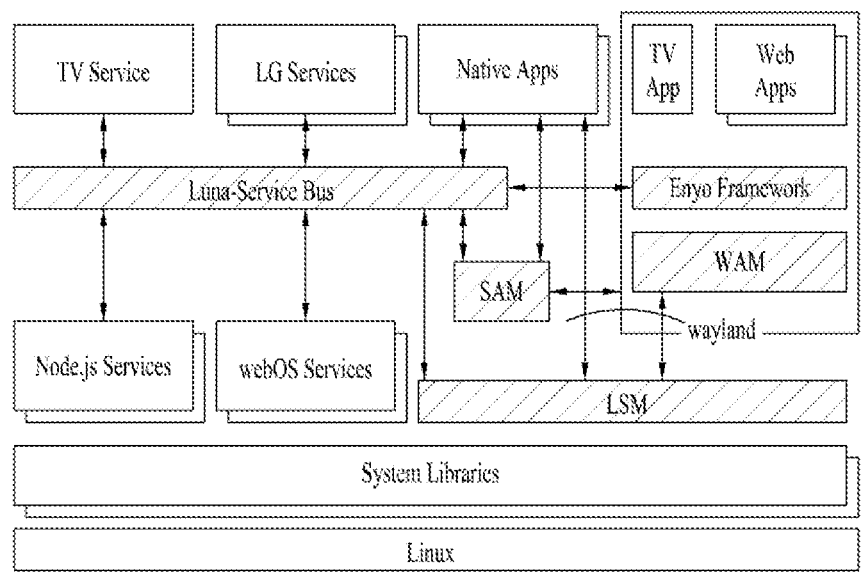
FIG. 8 is a diagram illustrating architecture of a WebOS device according to one embodiment of the present invention.

FIG. 8 is a diagram illustrating the architecture of a WebOS device according to one embodiment of the present invention. In particular, FIG. 8 is a block diagram based on a runtime of a WebOS device and is described with reference to the layered structure of FIG. 7. Hereinafter, a description will be given with reference to FIGS. 7 and 8.

Referring to FIG. 8, services, applications and WebOS core modules are included on a system OS (Linux) and system libraries and communication therebetween may be performed via a Luna-service bus. Node.JS services based on HTML5 such as e-mail, contact or calendar, CSS, Javascript, etc., WebOS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via WebOS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the WebOS component is achieved via a QML extensibility plug-in and graphic operation of an application may be based on Wayland protocol, luna-service call, etc.

The LSM is an abbreviation for a Luna surface manager and functions as an application window compositor. The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
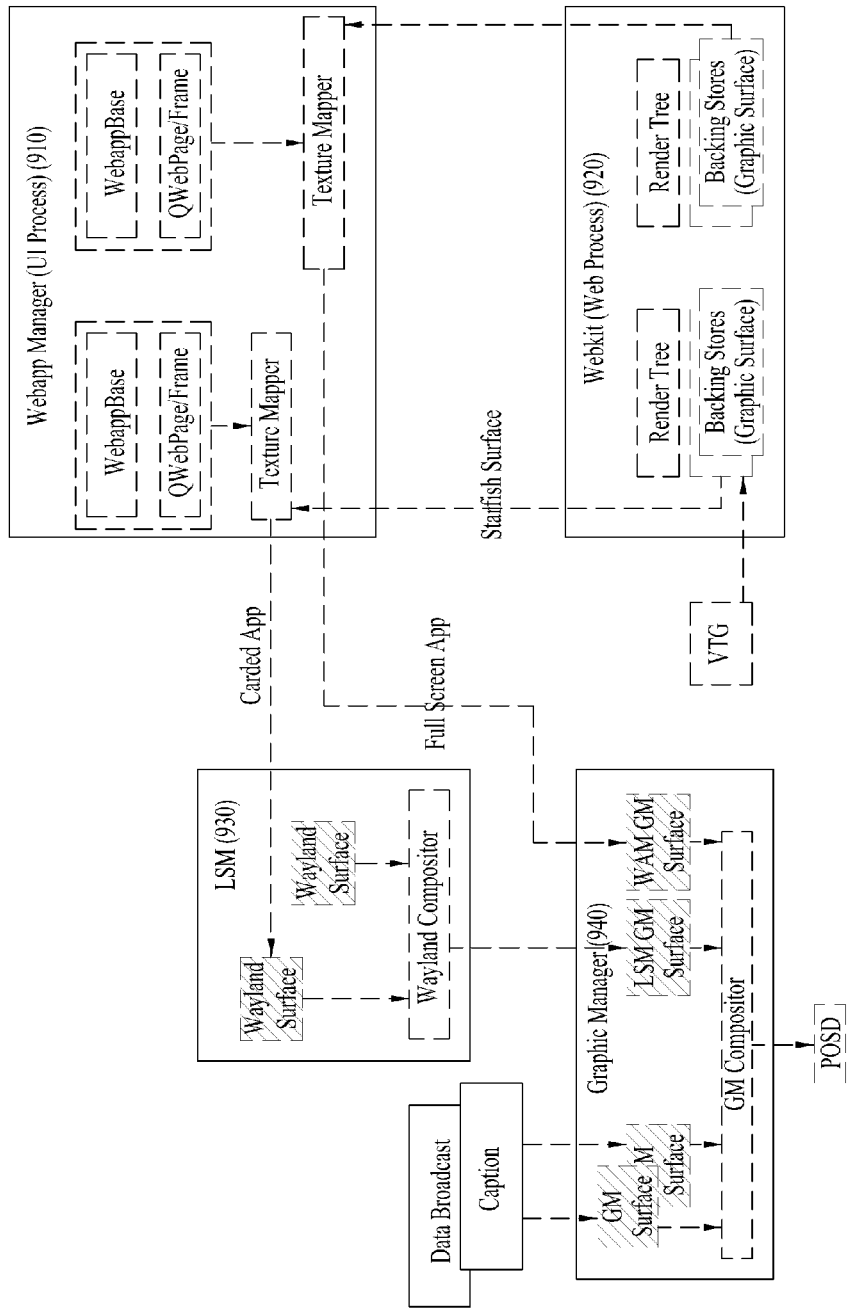
FIG. 9 is a diagram illustrating a graphic composition flow in a WebOS device according to one embodiment of the present invention.

FIG. 9 is a diagram illustrating a graphic composition flow in a WebOS device according to one embodiment of the present invention. Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this instance, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface. The graphics manager processes and outputs all graphics data in the WebOS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
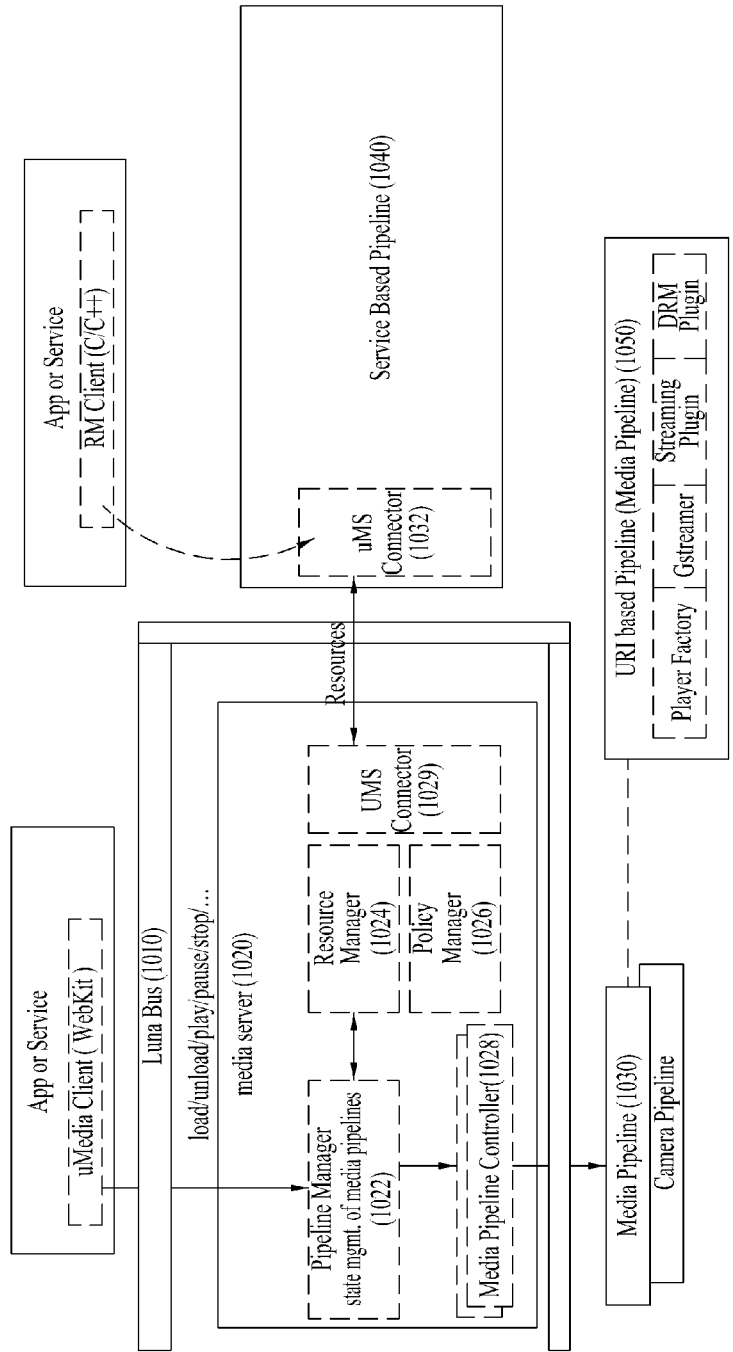
FIG. 10 is a diagram illustrating a media server according to one embodiment of the present invention.
Figure 11:
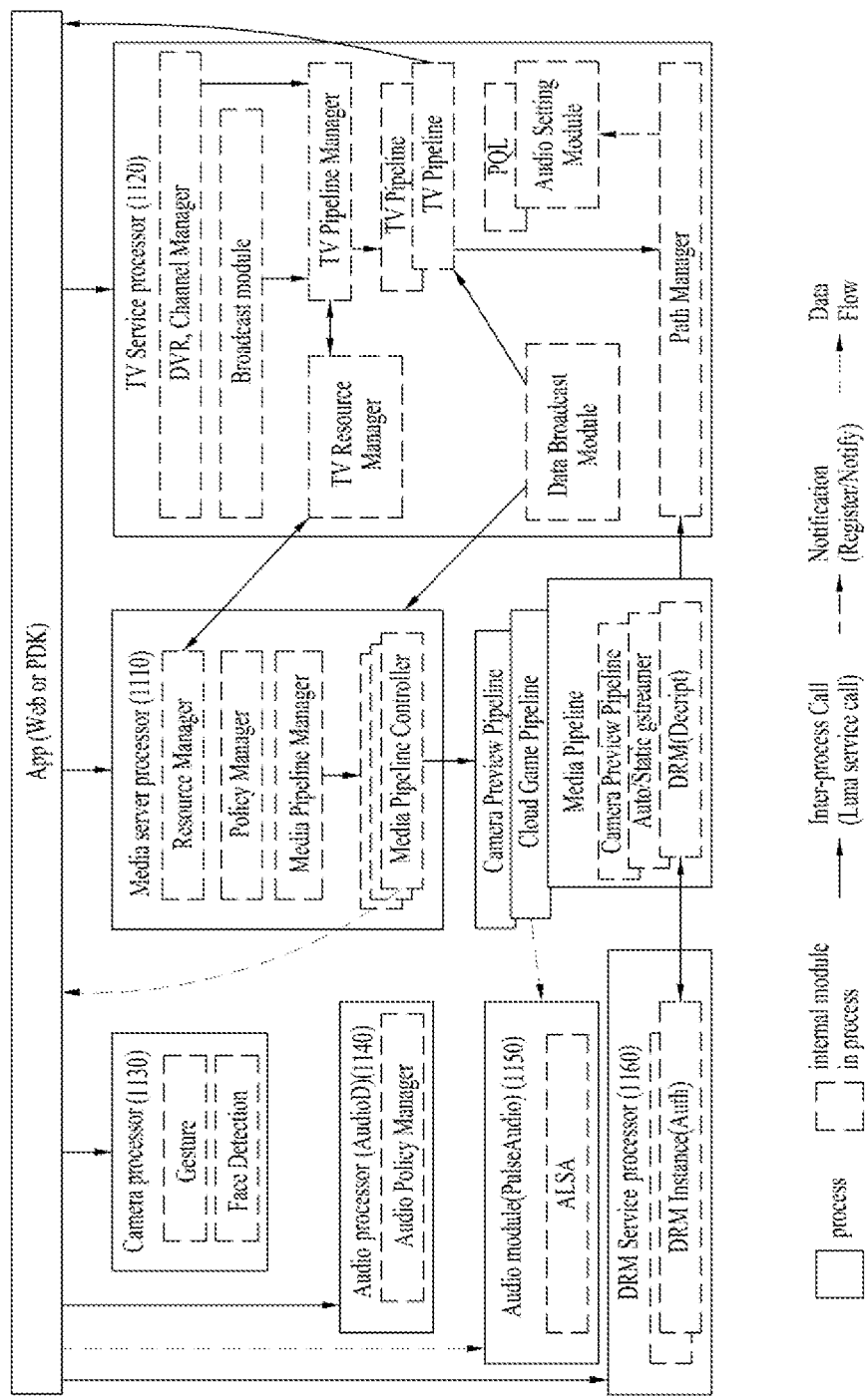
FIG. 11 is a block diagram showing the configuration of a media server according to one embodiment of the present invention.
Figure 12:
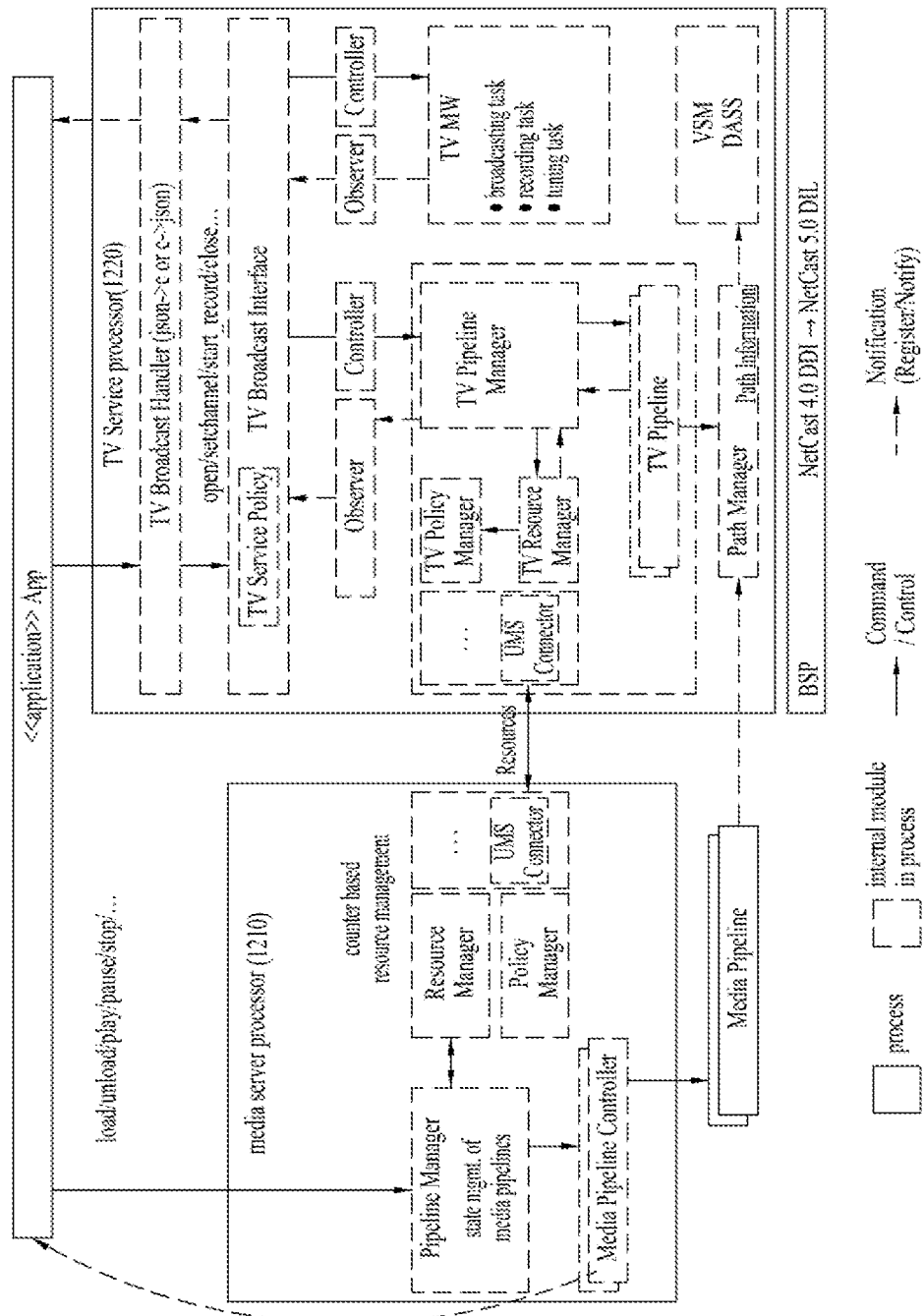
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media. The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example. The media server mainly manages micro resources such as a resource manager or a policy manager. The media server also controls playback of web standard media content. The media server may manage pipeline controller resources.

The media server supports extensibility, reliability, efficient resource usage, etc., for example. In other words, the uMS, that is, the micro media server, manages and controls resource usage for appropriate processing within the WebOS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail. In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients. The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smartshare playback, thumbnail extraction, NDK, cinema, multimedia and hypermedia information coding experts group (MHEG), etc. The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this instance, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows. An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used. Alternatively, a method of using in existing CP may be used. For backward compatibility, plug-in of an existing platform may be extended and used based on Luna. Lastly, an interface method using a non-WebOS may be used. In this instance, a Luna bus may be directly called to perform interfacing.

Seamless change is processed by a separate module (e.g., TVwin) and refers to a process of first displaying a TV program on a screen without a WebOS before or duration WebOS booting and then performing seamless processing. This is used for the purpose of first providing a basic function of a TV service, for fast response to a power-on request of a user, because a booting time of a WebOS is late. The module is a part of a TV service process and supports seamless change for providing fast booting and a basic TV function, factory mode, etc. The module is responsible for switching from the non-WebOS mode to the WebOS mode.

FIG. 11 shows the processing structure of the media server. In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components. A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described. FIG. 12 shows the media server processor and the TV service processor of FIG. 11 in detail. Accordingly, a description will be given with reference to FIGS. 11 and 12.

First, if the application includes TV service data, the application is processed by the TV service processor 1120/1220. The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components may be added. The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this instance, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210. The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example. In the present specification, the resource manager in the media server processor 1110/1210 may perform resource management on a counter base for example.

Embodiments of the present invention are described with reference to FIGS. 13 to 25 as follows. First of all, in describing and understanding the embodiments of the present invention in the following description, the former contents mentioned in association with FIGS. 1 to 12 can be referred to. Secondly, the display or digital device mentioned in the foregoing description may include a display device according to one embodiment of the present specification.

In the following description, a display device according to one embodiment of the present invention may conceptually include one of a TV, a smart TV, a hybrid broadcast broadband television (HBBTV), a network TV, a web TV, an internet protocol television (IPTV), a personal computer, a tablet PC, a notebook, a netbook, a PMP, a smartphone, a smartwatch, a smart glass, a navigation, and the like for example. In addition, a mobile terminal described in the present specification may conceptually include one of a smartphone, a smartwatch, smart glasses, and the like.

Figure 13:
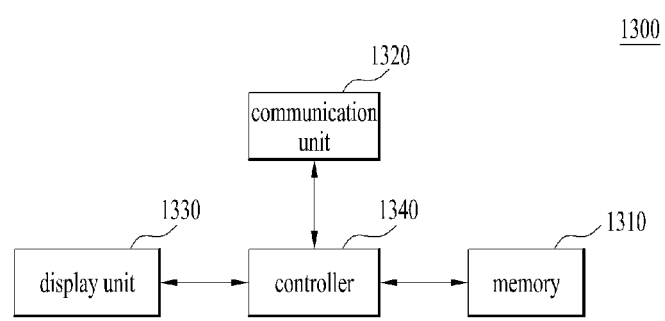
FIG. 13 is a block diagram illustrating configuration modules of a mobile terminal according to one embodiment of the present invention.

FIG. 13 is a block diagram illustrating configuration modules of a mobile terminal according to one embodiment of the present invention. Referring to FIG. 13, a mobile terminal 1300 according to one embodiment of the present invention may include a memory 1310, a communication unit 1320, a display unit 1330, a controller 1340, and the like. The configuration modules shown in FIG. 13 and other configuration modules failing to be shown in FIG. 13 can refer to the configurations shown in FIGS. 1 to 12.

The memory 1310 may store various programs, applications, algorithms and the like, which are required for operations of the mobile terminal 1300. According to the present embodiment, the memory 130 may previously store a specific application for performing a function of controlling a preset external display device. In particular, the specific application may include an application for performing a function of controlling the digital device described with reference to FIG. 2. For instance, the specific application may include an application for performing a function of a remote controller of TV. In addition, the memory 1340 may be embodied into the former memory 360 shown in FIG. 3.

The communication unit 1320 can connect a communication with a preset external display device. The communication unit 1320 can receive at least one of first information on a viewing history of a content from the preset external display device and second information on at least one application saved in a memory of the preset external display device. In addition, the communication unit 1320 may be embodied into the wireless communication unit 310 shown in FIG. 3.

The display unit 1330 can display an execution screen of the specific application. Further, the execution screen may contain an icon of the at least application created based on the second information. In addition, the display unit 1330 may be embodied into the display unit 351 shown in FIG. 3.

The controller 1340 controls operations of the digital device 1300 and also manages functions of the memory 1310, the communication unit 1320 and the display unit 1330 overall. In addition, the controller 1340 may be embodied into the former controller 380 shown in FIG. 3.

Further, according to one embodiment of the present invention, the controller 1340 of the mobile terminal 1300 can control the display unit 1330 to display a list of contents recently displayed on the communication-connected preset external display device and a list of recommended contents. This is described in detail with reference to FIGS. 14 to 16 as follows.

Figure 14:
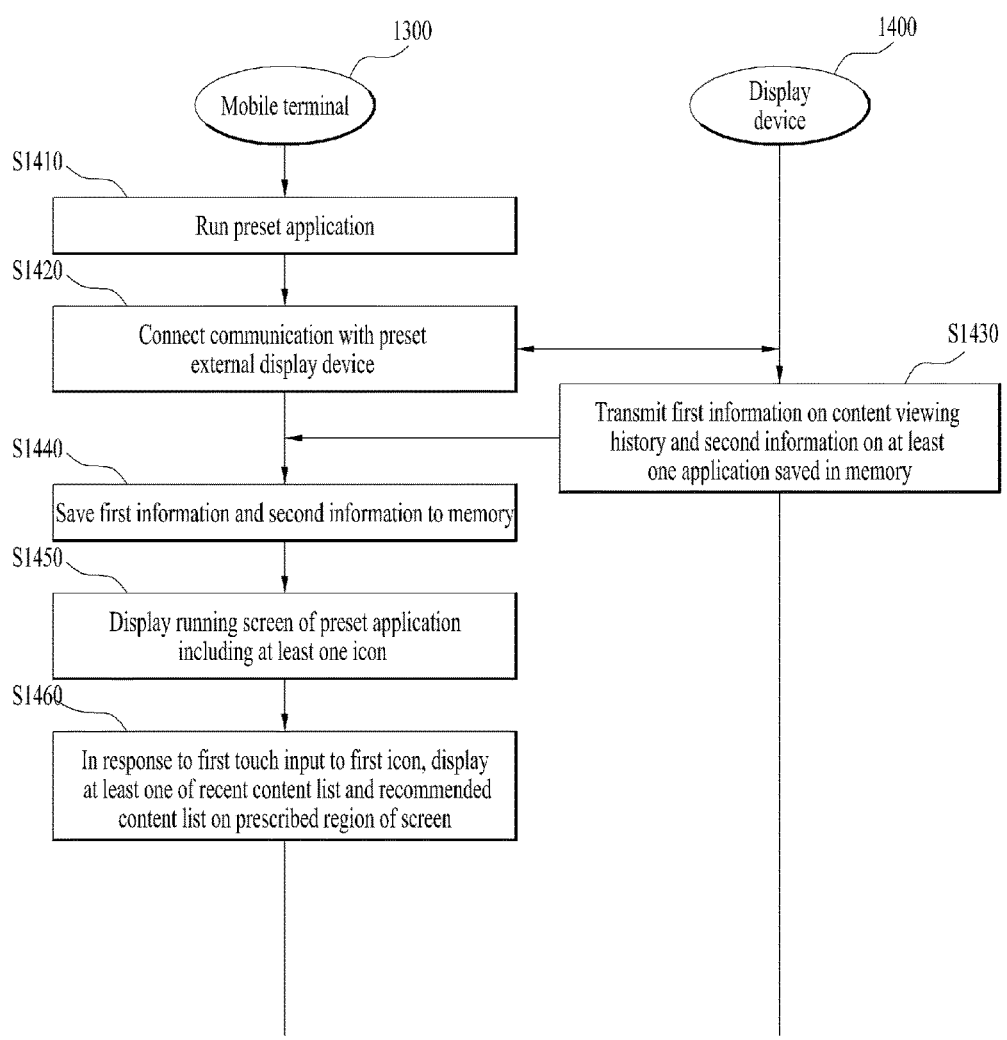
FIG. 14 is a flowchart illustrating one example of a method of displaying a list of contents recently displayed on a communication-connected preset external display device and a list of recommended contents in a mobile terminal according to one embodiment of the present invention.

FIG. 14 is a flowchart illustrating one example of a method of displaying a list of contents recently displayed on a communication-connected preset external display device and a list of recommended contents in a mobile terminal according to one embodiment of the present invention. Regarding FIG. 14, configuration modules of a display device 1400 are described with reference to the configuration modules of the former digital device described with reference to FIG. 4.

Referring to FIG. 14, the controller 1340 of the mobile terminal 1300 can run a preset application in response to a command for executing the preset application (S1410). For instance, the preset application may include an application for performing a function of controlling a preset external display device. In particular, the preset application may include an application for performing a function of a remote controller.

As the preset application is run, the controller 1340 can control the communication unit 1320 to connect a communication with a preset external display device 1400 (S1420). Further, the communication unit 1320 generally connects a wireless communication with the preset external display device 1400. In addition, the communication unit 1320 may connect a wired communication with the preset external display device 1400 as well.

For instance, the preset external display device 1400 may include a preset external display device 1400 selected by a user from a plurality of preset external display devices 1400 communication-connectible to the mobile terminal 1300 or may include a display device 1400 having a previous communication connected history, by which types of the preset external display device is non-limited.

According to an embodiment, the controller 1340 may connect a communication with the preset external display device 1400 before the step S1410. Alternatively, the controller 1340 may connect a communication with the preset external display device 1400 at the same time of the step S1410. Alternatively, the controller 1340 may control the communication unit 1320 to connect a communication with the preset external display device 1400 in response to user's specific command.

The controller 1340 can control the communication unit 1320 to receive at least one of first information on a content viewing history and second information on at least one application saved in a memory of the preset external display device 1400 from the communication-connected preset external display device 1400 (S1430).

In particular, the first information on the content viewing history and the second information on the at least one application may be saved in the memory of the display device 1400. In addition, a network interface unit of the display device 1400 can send the first information and the second information to the mobile terminal 1300. In more particular, if a specific signal according to an execution of a preset application is received from the mobile terminal 1300, the network interface unit of the display device 1400 can send the first information and the second information to the communication-connected mobile terminal 1300.

In the step S1430, the first information is the information on at least one content displayed on the preset external display device 1400 and may include information on a play time of the content, information on a title of the content, information on a type of the content displayed on the preset external display device 1400, information on series of the content displayed on the preset external display device 1400 (e.g., information on season and episodes of the content), information on an application runnable by the content, information on a channel scheduled to broadcast the content, and the like. In particular, the first information may include the information on a viewing history of at least one content played in the display device 1400.

In the step S1430, the second information may include an icon image data of each of at least one application saved in the memory of the preset external display device 1400, information on a title of each of the at least one application, information on at least one content runnable in each of the at least one application, information on at least one content run in each of the at least one application, and the like. In particular, the second information may include information on each of at least one application runnable in the display device 1440 by being saved in the memory of the display device 1400.

Eventually, in the step S1430, the network interface unit of the display device can send at least one of the first information on the content viewing history and the second information on the at least one application saved in the memory to the communication-connected mobile terminal 1300.

The controller 1340 of the mobile terminal 1300 can save the first and second information saved in the step S1430 to the memory 1310 (S1440). For instance, if the first and second information of the communication-connected preset external display device 1400 are not saved in the memory 1310, the controller 1340 can save the received first information and the received second information to the memory 1310. Further, when the controller 1340 receives the first information and the second information from the preset external display device 1400, the controller 1340 receives the information on the preset external display device 1400 as well. Hence, the controller 1340 can save the received information on the preset external display device 1400 to the memory 1310 together with the first information and the second information.

In another instance, when the first information and the second information of the communication-connected preset external display device 1400 are already saved in the memory 1310, only if the received first information and the received second information are different from the first information already saved in the memory 1310 and the second information already saved in the memory 1310, the controller 180 can save the received first information and the received second information to the memory 1310. In particular, using the received first information and the received second information, the controller 1340 can update the first information already saved in the memory 1310 and the second information already saved in the memory 1310. Yet, if the received first information and the received second information correspond to the first information already saved in the memory 1310 and the second information already saved in the memory 1310, the controller 180 can not update the first information and the second information.

According to an embodiment, information on an external display device having sent the first information and the second information may be saved in the memory 1310 together with the first information and the second information. In addition, the controller 1340 can control the communication unit 1320 to receive the information on the communication-connected preset external display device 1400 from the preset external display device 1400.

The controller 1340 can control the display unit 1330 to display an execution screen of the preset application. Based on the received second information (or the second information saved in the memory 1310), the controller 1340 can control the display unit 1330 to display an icon of the at least one application on the execution screen (S1450). This shall be described in detail later with reference to FIG. 15.

In response to first touch input to a specific icon among icons of the at least one or more applications, which are displayed on the execution screen, the controller 1340 can control the display unit 1330 to display at least one of a list of recent contents run on a specific application corresponding to the specific icon and a recommended content list on a prescribed region of the execution screen based on at least one of the first information and the second information (S1460). For instance, the first touch input may include a touch input of touching the specific icon for a preset time, by which the present invention is non-limited. The first touch input may include one of a touch input of dragging the specific icon, a touch input of touching the specific icon, and the like.

In the step S1460, the recent content list may include a list of at least one content previously run in at least one application saved in the memory of the communication-connected preset external display device 1400. In particular, the controller 1340 can recognize the recent content list using a specific information (e.g., information on a play time of the content, etc.) included in the received first information and a specific information (e.g., information on at least one content run in the application corresponding to the specific icon, etc.) included in the received second information.

The recent content list may include a thumbnail image of at least one content previously run on the specific application and third information indicating a play time of each of the at least one content. In this instance, the third information may include information on a play end timing point of each of the at least one content, information on a total play time of each of the at least one content, information (e.g., a progress bar, etc.) indicating a play progress rate of each of the at least one content, and the like. In particular, the controller 1340 can provide a recently watched content list and a progress bar as the recent content list. A user can recognize how much each of the at least one content is viewed intuitively by checking the third information.

In the step S1460, the recommended content list may include a list of at least one recommended content extracted from at least one or more contents runnable on the application corresponding to the specific application by recognizing user's experience. In particular, the controller 1340 can extract at least one recommended content using a specific information (e.g., information on a type of a content displayed on the preset external display device 1400, a series information (e.g., information on season and episodes of the content, etc.) of a content displayed on the preset external display device 1400, information on an application runnable by the content, etc.) included in the first information and a specific information (e.g., information on a content runnable on an application corresponding to the specific content, etc.) included in the second information. Using the extracted at least one recommended content, the controller 1340 can create the recommended content list. In particular, using information on a content viewed by a user through the display device 1400, the controller 1340 can create the recommended content list.

The recommended content list may include a thumbnail image of the at least one recommended content, information on a title of the at least one recommended content, detailed information (e.g., information on episodes, information on season, etc.) on the at least one content, and the like. For instance, if a user views Episode 1 of Season 1 of first content already, the recommended content list may include Episode 2 of Season 1 of the first content and Episode 3 of Season 1 of the first content. In particular, contents related to a previously viewed by the user can be recommended to the user if the user checks the recommended content list. According to the present embodiment, it is advantageous in that the mobile terminal 1330 can guide a user with a content to be viewed through the display device 1400.

Further, according to one embodiment of the present invention, an icon of at least one application saved in the memory of the display device 1400 may be displayed on the display unit 1330 of the mobile terminal 1300. This is described in detail with reference to FIG. 15 as follows.

Figure 15:
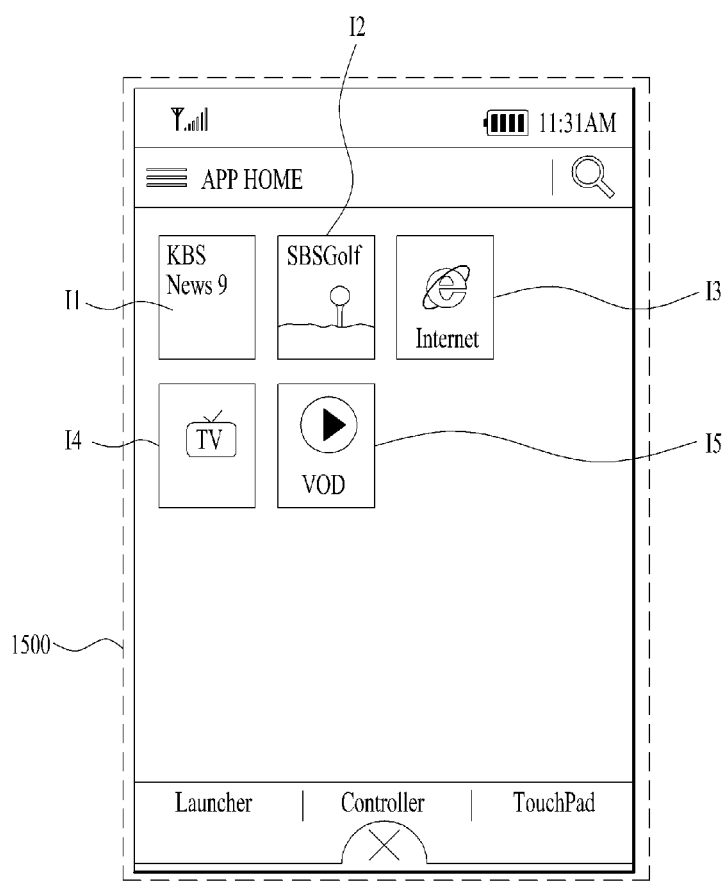
FIG. 15 is a diagram illustrating one example of a method of displaying an icon of at least one application saved in a memory of a display device in a mobile terminal according to one embodiment of the present invention.

FIG. 15 is a diagram illustrating one example of a method of displaying an icon of at least one application saved in a memory of a display device in a mobile terminal according to one embodiment of the present invention. Regarding the description with reference to FIG. 15, the substance redundant with the foregoing description with reference to FIG. 14 is not mentioned again and the following description is made centering on the differences.

According to one embodiment of the present invention, the controller 1340 of the mobile terminal 1300 can control the communication unit 1320 to connect a communication with a preset external device (e.g., the preset external display device 1400). From the communication-connected preset external display device, the controller 1340 can receive at least one of first information on a viewing history and second information on at least one application saved in a memory of the preset external display device.

Referring to FIG. 15, the controller 1340 can control the display unit 1330 to display an execution screen 1500 of a preset application (e.g., a remote controller application). In this instance, the preset application may include an application already saved in the memory 1310.

The execution screen 1500 may include icons I1, I2, I3, I4 and I5 of at least one or more applications saved in the memory of the communication-connected preset external display device 1400. For instance, when first application is saved in the memory of the display device 1400, the execution screen 1500 may include the first icon I1 of the first application.

In another instance, when a plurality of applications are saved in the memory of the display device 1400, the execution screen 150 may include icons (e.g., the first icon I1, the second icon I2, the third icon I3, the fourth icon I4 and the fifth icon I5) of a plurality of the applications.

Further, according to one embodiment of the present invention, in response to first touch input to a specific one of the at least one or more icons I1 to I5 included in the execution screen 1500, the controller 1340 can control the display unit 1330 to display at least one of a recent content list run on a specific application corresponding to the specific icon and a recommended content list on a prescribed region of the execution screen 1500. This is described in detail with reference to FIG. 16 as follows.

Figure 16:
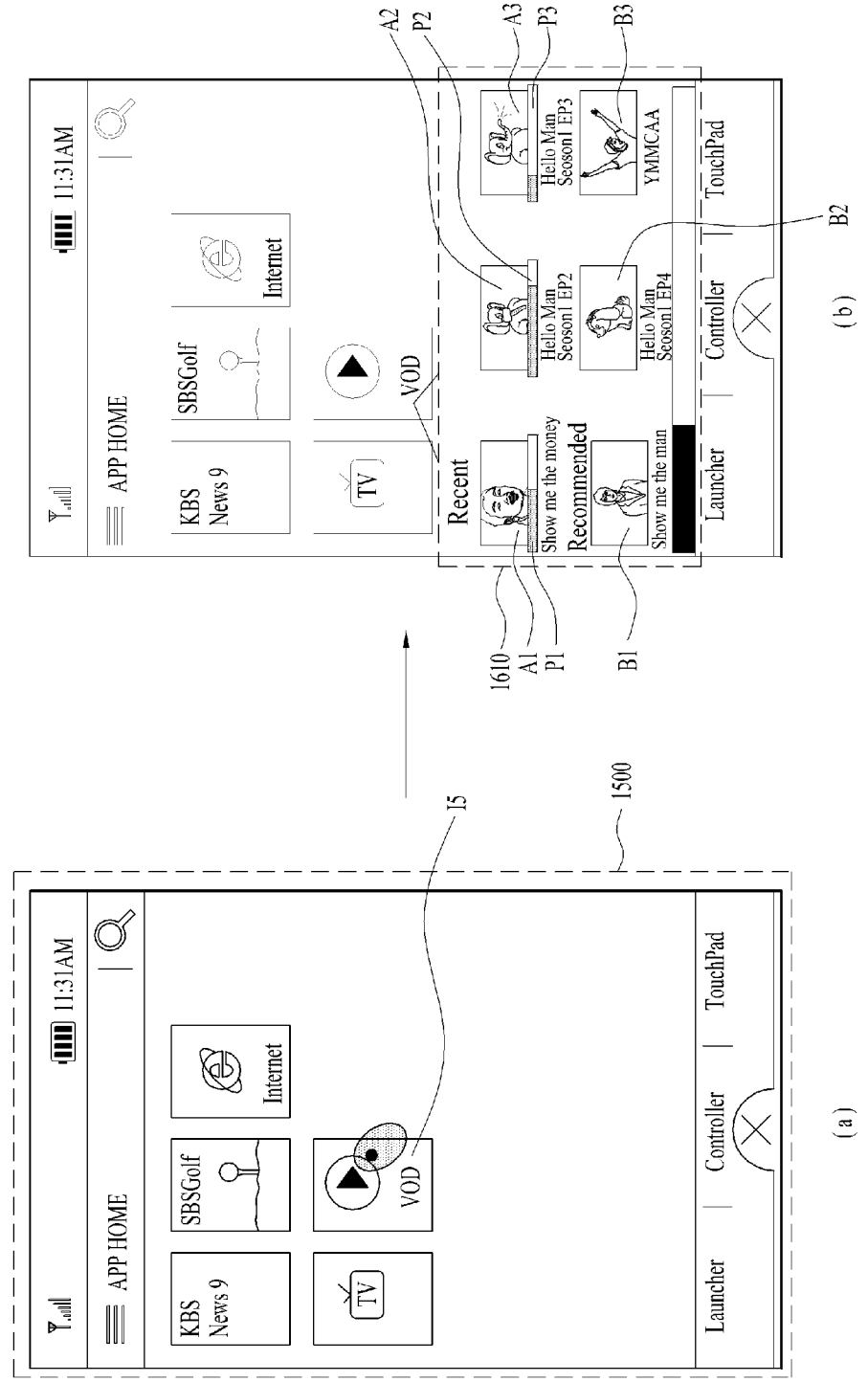
FIG. 16 is a diagram illustrating one example of a method of displaying at least one of a list of contents recently run on a specific application saved in a communication-connected display device and a recommended content list in a mobile terminal according to one embodiment of the present invention.

In particular, FIG. 16 is a diagram illustrating one example of a method of displaying at least one of a list of contents recently run on a specific application saved in a communication-connected display device and a recommended content list in a mobile terminal according to one embodiment of the present invention. Regarding the description with reference to FIG. 16, the substance redundant with the foregoing descriptions with reference to FIG. 14 and FIG. 15 is not mentioned again and the following description is made centering on the differences.

According to one embodiment of the present invention, the controller 1340 of the mobile terminal 1300 can control the communication unit 1320 to connect a communication with a preset external device (e.g., a display device, etc.). In this instance, the preset external device is non-limited by a display device.

Referring to FIG. 16, the controller 1340 can control the communication unit 1320 to receive at least one of first information on a convent viewing history and second information on at least one application saved in a memory of the preset external display device from the communication-connected preset external display device 1400. The memory 1310 may store at least one of a preset application, the received first information, and the received second information.

Referring to FIG. 16 (*a*), in response to a command for executing the preset application, the controller 1340 can control the display unit 1330 to display an execution screen 1500 of the preset application (e.g., a remote controller application, etc.). In addition, the controller 1340 can control the display unit 1330 to display an icon of the at least one application on the execution screen 1500 based on the received second information.

Referring to FIG. 16 (*b*), in response to first touch command for a specific icon (e.g., fifth icon I5) among icons of the at least one or more applications (cf. FIG. 16 (*a*)), the controller 1340 can control the display unit 1330 to display at least one of a recent content list run on a specific application corresponding to the specific icon and a recommended content list on a prescribed region 1610 of the execution screen 1500 based on the first information.

In this instance, the recent content list may include a list of at least one content previously run on at least one application saved in the memory of the communication-connected preset external display device 1400. In particular, the controller 1340 can recognize the recent content list using a specific information (e.g., information on a play time of the content, etc.) included in the received first information and a specific information (e.g., information on at least one content run in the application corresponding to the specific icon, etc.) included in the received second information.

The recent content list may include thumbnail images A1, A2 and A3 of at least one or more contents previously run on the specific application and third information indicating a play time of each of the at least one or more contents. In this instance, the third information may include information on a play end timing point of each of the at least one or more contents, information on a total play time of each of the at least one or more contents, information (e.g., progress bars P1, P2 and P3, etc.) indicating a play progress rate of each of the at least one or more contents, and the like. In particular, the controller 1340 can provide a recently watched content list and a progress bar as the recent content list. A user can recognize how much each of the at least one or contents is viewed intuitively by checking the third information.

The recommended content list may include a list of at least one recommended content extracted from at least one or more contents runnable on the application corresponding to the specific application by recognizing user's experience. In particular, the controller 1340 can extract at least one recommended content using a specific information (e.g., information on a type of a content displayed on the preset external display device 1400, a series information (e.g., information on season and episodes of the content, etc.) of a content displayed on the preset external display device 1400, information on an application runnable by the content, etc.) included in the first information and a specific information (e.g., information on a content runnable on an application corresponding to the specific content, etc.) included in the second information. Using the extracted at least one recommended content, the controller 1340 can create the recommended content list. In particular, using information on a content viewed by a user through the display device 1400, the controller 1340 can create the recommended content list related to the content previously viewed through the external display device 1400.

The recommended content list may include thumbnail images B1, B2 and B3 of the at least one or more recommended contents, information on a title of the at least one or more recommended contents, detailed information (e.g., information on episodes, information on season, etc.) on the at least one content, and the like. For instance, if a user views Episode 1 of Season 1 of first content already, the recommended content list may include Episode 2 of Season 1 of the first content and Episode 3 of Season 1 of the first content. In particular, contents related to a previously viewed by the user can be recommended to the user if the user checks the recommended content list. According to the present embodiment, it is advantageous in that the mobile terminal 1330 can guide a user with a content to be viewed through the display device 1400.

Further, according to one embodiment of the present invention, a user can use the mobile terminal 1300 to enable the communication-connected preset external display device to display a specific content. This is described in detail with reference to FIG. 17 as follows.

Figure 17:
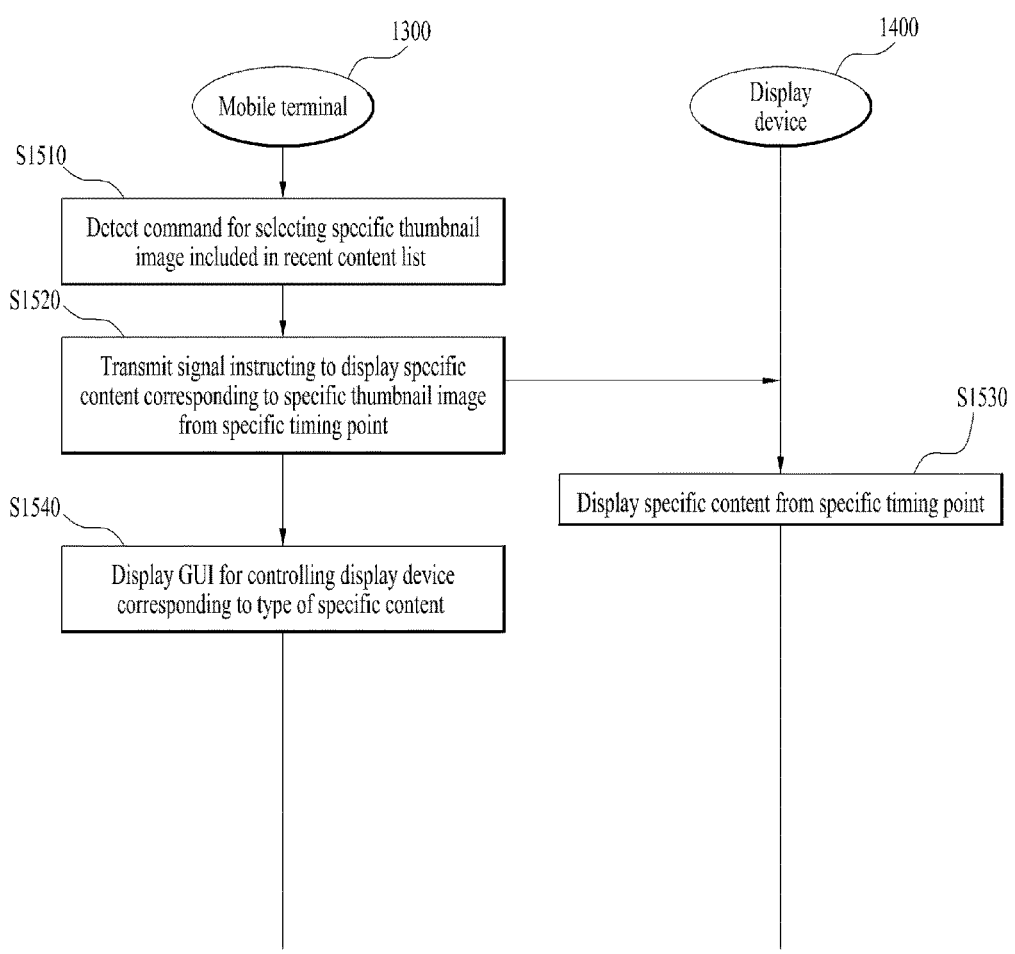
FIG. 17 is a flowchart illustrating one example of a method of displaying a specific content on a communication-connected preset external display device in a mobile terminal according to one embodiment of the present invention.

FIG. 17 is a flowchart illustrating one example of a method of displaying a specific content on a communication-connected preset external display device in a mobile terminal according to one embodiment of the present invention. Regarding the description with reference to FIG. 17, the substance redundant with the foregoing descriptions with reference to FIGS. 14 to 16 is not mentioned again and the following description is made centering on the differences.

According to one embodiment of the present invention, referring to FIG. 17, the controller 1340 of the mobile terminal 1300 can control the communication unit 1320 to receive at least one of first information on a content viewing history and second information on at least one application saved in a memory of the preset external display device 1400 from the communication-connected preset external display device 1400.

In addition, the controller 1340 can control the display unit 1330 to display an icon of the at least one application based on the second information. In response to first touch input to a specific icon among icons of the at least one or more applications, the controller 1340 can control the display unit 1330 to display at least one of a list of recent contents run on a specific application corresponding to the specific icon and a recommended content list on a prescribed region of a screen based on at least one of the first information and the second information. In this instance, the recent content list may include a thumbnail image of at least one content previously run on the specific application and third information indicating a play time of each of the at least one content. In addition, the recommended content list may include a thumbnail image of at least one recommended content.

The controller 1340 can detect a command for selecting a specific thumbnail image included in the recent content list (S1510). For instance, the command for selecting the specific thumbnail image may include a touch command of touching a random one point on a region having the specific thumbnail image displayed thereon, by which the corresponding command is non-limited. Instead, the command for selecting the specific thumbnail image may include a touch command of dragging the specific thumbnail image or a touch command of touching the specific thumbnail image over a preset time.

In response to the command for selecting the specific thumbnail image included in the recommended content list, the controller 1340 can control the communication unit 1320 to send first signal, which instructs to display a specific content correspond to the specific thumbnail image, to the communication-connected preset external display device 1400 (S1520).

In this instance, the touch input for selecting the specific thumbnail image of the specific content may include one of a touch input of touching the thumbnail image of the specific content for a preset time, a touch input of dragging the thumbnail image of the specific content in a specific direction, and the like. If the first signal is received in the step S1520, the display device 1400 can display the specific content from a specific timing point (S1530).

Further, the controller 1340 of the mobile terminal 1300 can control the display unit 1330 to display a GUI (graphical user interface) configured to control the preset external display device in association with the specific content in response to the transmission of the first signal (S1540). This shall be described in detail with reference to FIG. 21 and FIG. 22.

Figure 18:
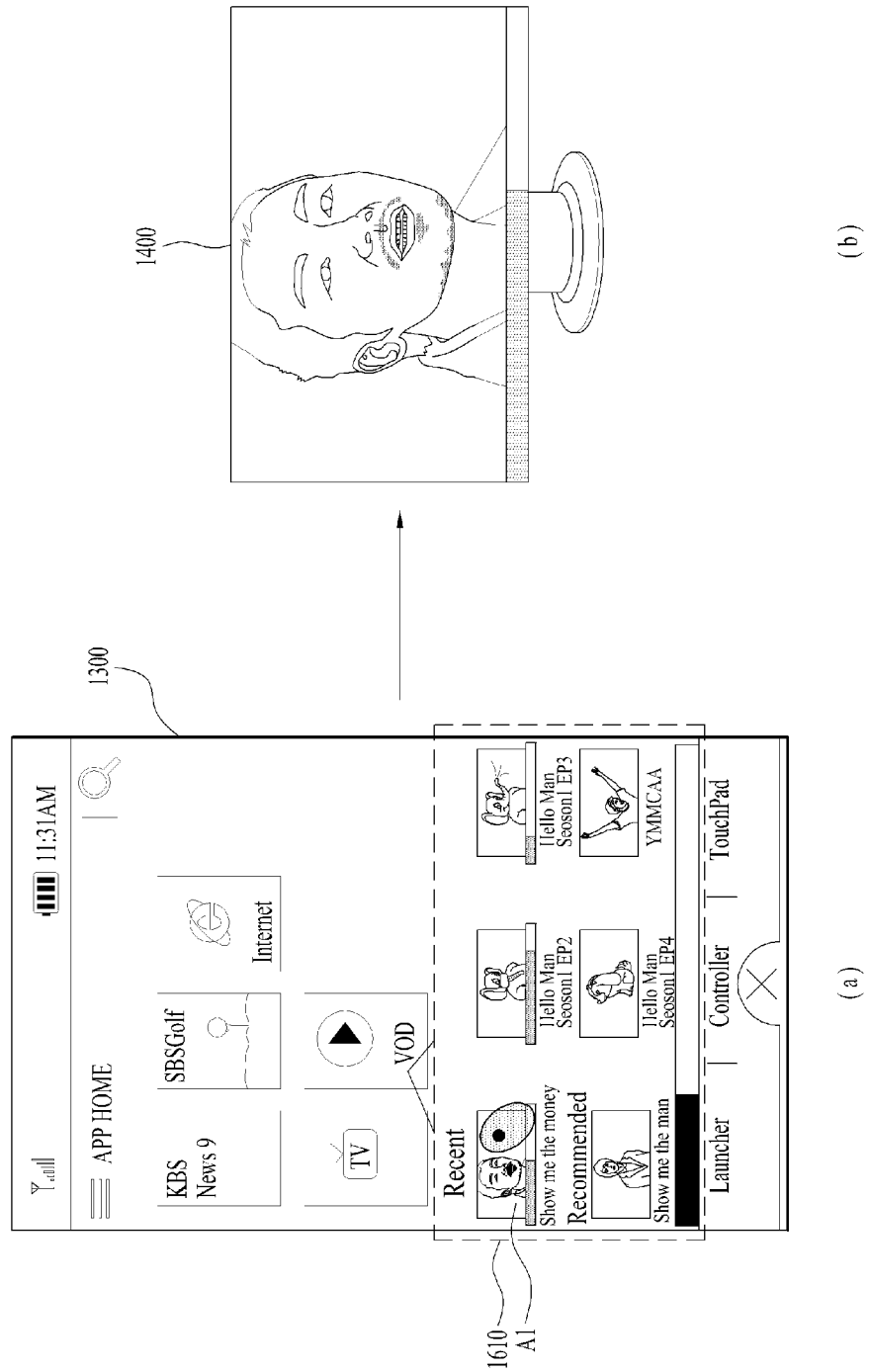
FIG. 18 is a diagram illustrating one example of a method of displaying a specific content on a communication-connected preset external display device in a mobile terminal according to one embodiment of the present invention.

FIG. 18 is a diagram illustrating one example of a method of displaying a specific content on a communication-connected preset external display device in a mobile terminal according to one embodiment of the present invention. Regarding the description with reference to FIG. 18, the substance redundant with the foregoing descriptions with reference to FIGS. 14 to 17 is not mentioned again and the following description is made centering on the differences.

According to one embodiment of the present invention, referring to FIG. 18, the controller 1340 of the mobile terminal 1300 can control the communication unit 1320 to receive at least one of first information on a content viewing history and second information on at least one application saved in a memory of the preset external display device 1400 from the communication-connected preset external display device 1400.

The controller 1340 can control the display unit 1330 to display an icon of the at least one application based on the second information. In response to first touch input to a specific icon among icons of the at least one or more applications, the controller 1340 can control the display unit 1330 to display at least one of a list of recent contents run on a specific application corresponding to the specific icon and a recommended content list on a prescribed region of a screen based on at least one of the first information and the second information. In this instance, the recent content list may include a thumbnail image of at least one content previously run on the specific application and third information indicating a play time of each of the at least one content. In addition, the recommended content list may include a thumbnail image of at least one recommended content.

Referring to FIG. 18 (*a*), the controller 1340 can detect a command for selecting a specific thumbnail image A1 included in the recent content list. For instance, the command for selecting the specific thumbnail image A1 may include a touch command of touching a random one point on a region having the specific thumbnail image A1 displayed thereon, by which the corresponding command is non-limited. Instead, the command for selecting the specific thumbnail image A1 may include a touch command of dragging the specific thumbnail image A1 or a touch command of touching the specific thumbnail image A1 over a preset time.

In response to the command for selecting the specific thumbnail image A1 included in the recent content list, the controller 1340 can control the communication unit 1320 to send a first signal, which instructs to display a specific content correspond to the specific thumbnail image A1 from a specific timing point, to the communication-connected preset external display device 1400. In particular, the controller 1340 can control the communication unit 1320 to send the first signal, which instructs to run the specific content from the specific timing point, to the preset external display device based on the third information in response to the touch input for selecting the thumbnail image A1 of the specific content from at least one or more thumbnail images of at least one or more contents included in the recent content list. In this instance, the specific timing point may mean a last timing point at which the executing of the specific content was ended in the preset external display device 1400.

Referring to FIG. 18 (*b*), if the first signal is received, the display device 1400 can display the specific content from the specific timing point. Further, according to an embodiment, the third information on the specific content may be saved differently in each of a plurality of mobile terminals. In particular, after the specific content has been run up to first timing point only by controlling the preset external display device 1400 through first mobile terminal, if the specific content is played again by controlling the preset external display device 1400 through the first mobile terminal, the specific content can be played in the preset external display device 1400 from the first timing point.

After the specific content has been run up to second timing point different from the first timing point only by controlling the preset external display device 1400 through second mobile terminal, if the specific content is played again by controlling the preset external display device 1400 through the second mobile terminal, the specific content can be played in the preset external display device 1400 from the second timing point.

Figure 19:
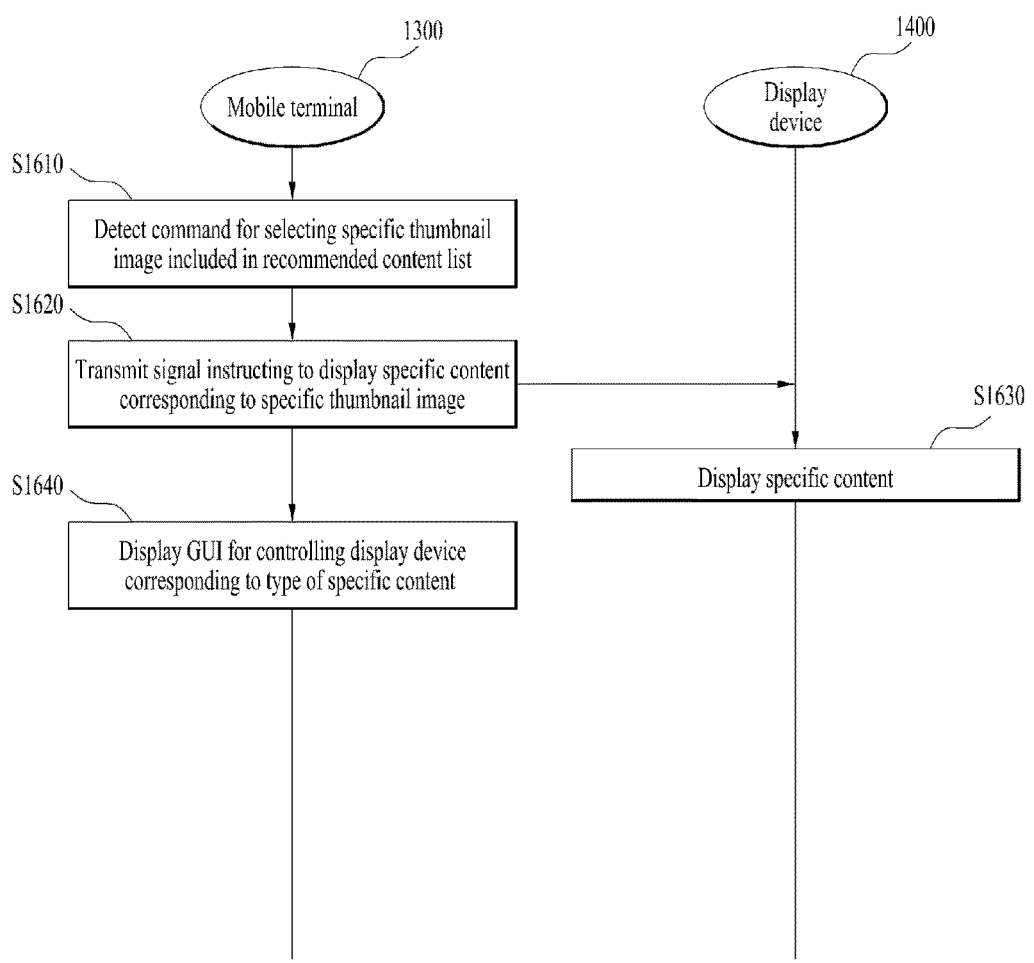
FIG. 19 is a flowchart illustrating another example of a method of displaying a specific content on a communication-connected preset external display device in a mobile terminal according to one embodiment of the present invention.

Next, FIG. 19 is a flowchart illustrating another example of a method of displaying a specific content on a communication-connected preset external display device in a mobile terminal according to one embodiment of the present invention. Regarding the description with reference to FIG. 19, the substance redundant with the foregoing descriptions with reference to FIGS. 14 to 18 is not mentioned again and the following description is made centering on the differences.

According to one embodiment of the present invention, referring to FIG. 19, the controller 1340 of the mobile terminal 1300 can control the communication unit 1320 to receive at least one of first information on a content viewing history and second information on at least one application saved in a memory of the preset external display device 1400 from the communication-connected preset external display device 1400. In addition, the controller 1340 can control the display unit 1330 to display an icon of the at least one application based on the second information.

In response to first touch input to a specific icon among icons of the at least one or more applications, the controller 1340 can control the display unit 1330 to display at least one of a list of recent contents run on a specific application corresponding to the specific icon and a recommended content list on a prescribed region of a screen based on at least one of the first information and the second information. In this instance, the recommended content list may include a list of at least one recommended content extracted from at least one or more contents runnable on the application corresponding to the specific application by recognizing user's experience. In particular, using information on a content viewed by a user through the display device 1400, the controller 1340 can create the recommended content list.

The recommended content list may include a thumbnail image of the at least one recommended content, information on a title of the at least one recommended content, detailed information (e.g., information on episodes, information on season, etc.) on the at least one content, and the like. For instance, if a user views Episode 1 of Season 1 of first content already, the recommended content list may include Episode 2 of Season 1 of the first content and Episode 3 of Season 1 of the first content. In particular, contents related to a previously viewed by the user can be recommended to the user if the user checks the recommended content list.

Further, the controller 1340 can detect a command for selecting a specific thumbnail image included in the recent content list (S1610). For instance, the command for selecting the specific thumbnail image may include a touch command of touching a random one point on a region having the specific thumbnail image displayed thereon, by which the corresponding command is non-limited. Instead, the command for selecting the specific thumbnail image may include a touch command of dragging the specific thumbnail image or a touch command of touching the specific thumbnail image over a preset time.

In response to the command for selecting the specific thumbnail image included in the recommended content list, the controller 1340 can control the communication unit 1320 to send first signal, which instructs to display a specific content correspond to the specific thumbnail image from a specific timing point, to the communication-connected preset external display device 1400 (S1620). In particular, the controller 1340 can control the communication unit 1320 to send the first signal, which instructs to run the specific content, to the preset external display device in response to a touch input for selecting a thumbnail image of the specific content from at least one or more thumbnail images included in the recommended content list.

In this instance, the touch input for selecting the specific thumbnail image of the specific content may include one of a touch input of touching the thumbnail image of the specific content for a preset time, a touch input of dragging the thumbnail image of the specific content in a specific direction, and the like. If the first signal is received in the step S1620, the display device 1400 can display the specific content (S1630).

Further, the controller 1340 of the mobile terminal 1300 can control the display unit 1330 to display a GUI (graphical user interface) configured to control the preset external display device in association with the specific content in response to the transmission of the first signal (S1640). This shall be described in detail with reference to FIG. 21 and FIG. 22.

Figure 20:
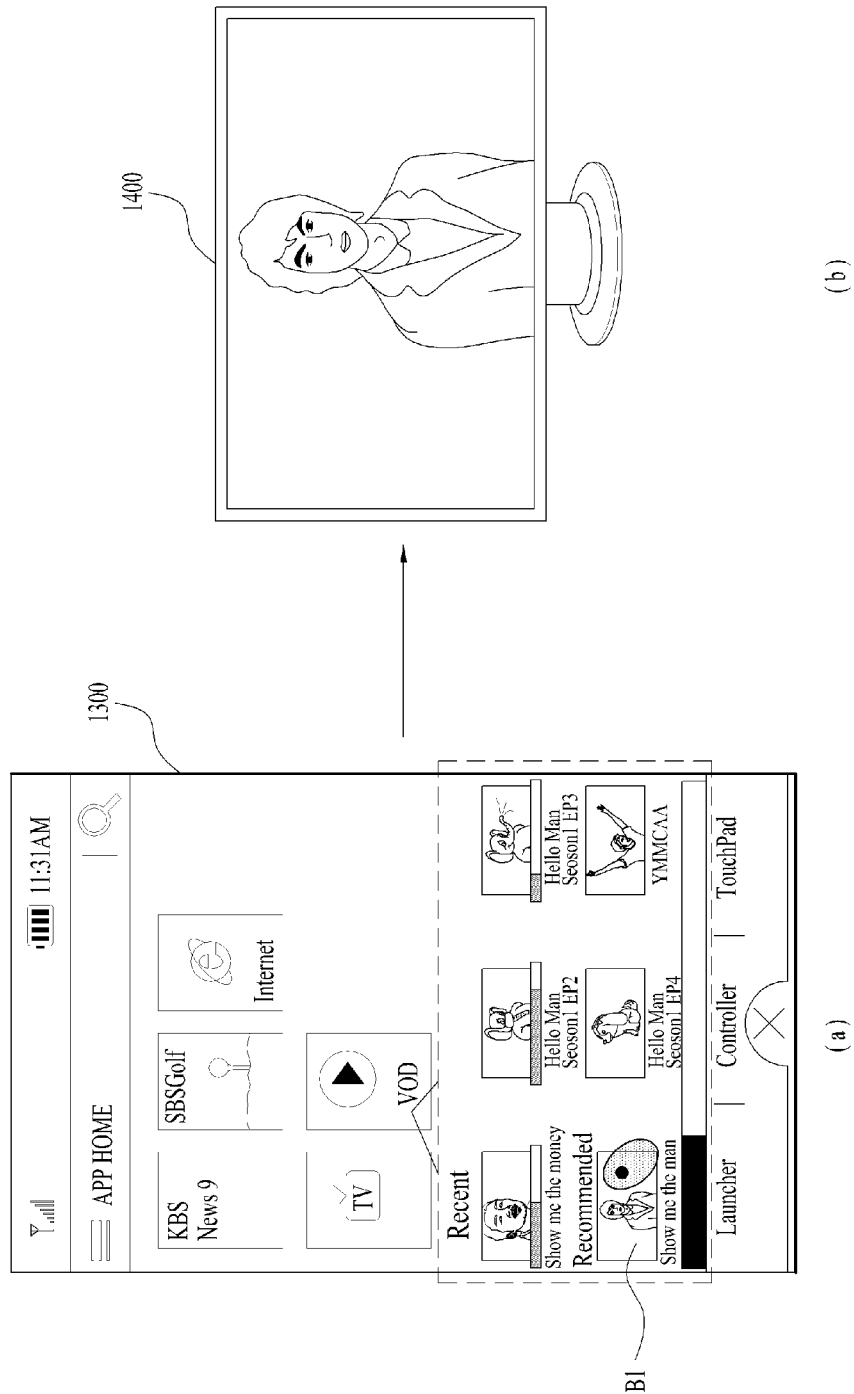
FIG. 20 is a diagram illustrating another example of a method of displaying a specific content on a communication-connected preset external display device in a mobile terminal according to one embodiment of the present invention.

FIG. 20 is a diagram illustrating another example of a method of displaying a specific content on a communication-connected preset external display device in a mobile terminal according to one embodiment of the present invention. Regarding the description with reference to FIG. 20, the substance redundant with the foregoing descriptions with reference to FIGS. 14 to 19 is not mentioned again and the following description is made centering on the differences.

According to one embodiment of the present invention, referring to FIG. 20, the controller 1340 of the mobile terminal 1300 can control the communication unit 1320 to receive at least one of first information on a content viewing history and second information on at least one application saved in a memory of the preset external display device 1400 from the communication-connected preset external display device 1400.

The controller 1340 can control the display unit 1330 to display an icon of the at least one application based on the second information. In response to first touch input to a specific icon among icons of the at least one or more applications, the controller 1340 can control the display unit 1330 to display at least one of a list of recent contents run on a specific application corresponding to the specific icon and a recommended content list on a prescribed region of a screen based on at least one of the first information and the second information. In this instance, the recent content list may include a thumbnail image of at least one content previously run on the specific application and third information indicating a play time of each of the at least one content. In addition, the recommended content list may include a thumbnail image of at least one recommended content.

Referring to FIG. 20 (*a*), the controller 1340 can detect a command for selecting a specific thumbnail image B1 included in the recommended content list. For instance, the command for selecting the specific thumbnail image B1 may include a touch command of touching a random one point on a region having the specific thumbnail image B1 displayed thereon, by which the corresponding command is non-limited. Instead, the command for selecting the specific thumbnail image B1 may include a touch command of dragging the specific thumbnail image B1 or a touch command of touching the specific thumbnail image B1 over a preset time.

In response to the command for selecting the specific thumbnail image B1 included in the recommended content list, the controller 1340 can control the communication unit 1320 to send first signal, which instructs to display a specific content correspond to the specific thumbnail image B1, to the communication-connected preset external display device 1400. In particular, the controller 1340 can control the communication unit 1320 to send the first signal, which instructs to run the specific content, to the preset external display device in response to the touch input for selecting the thumbnail image B1 of the specific content from at least one or more thumbnail images of at least one or more contents included in the recommended content list. Referring to FIG. 20 (*b*), if the first signal is received, the display device 1400 can display the specific content.

Further, according to an embodiment of the present invention, if a specific content is displayed on the communication-connected preset external display device 1400, it can control the display unit 1330 to display a GUI (graphical user interface) configured to control the preset external display device 400. This is described in detail with reference to FIG. 21 and FIG. 22 as follows.

Figure 21:
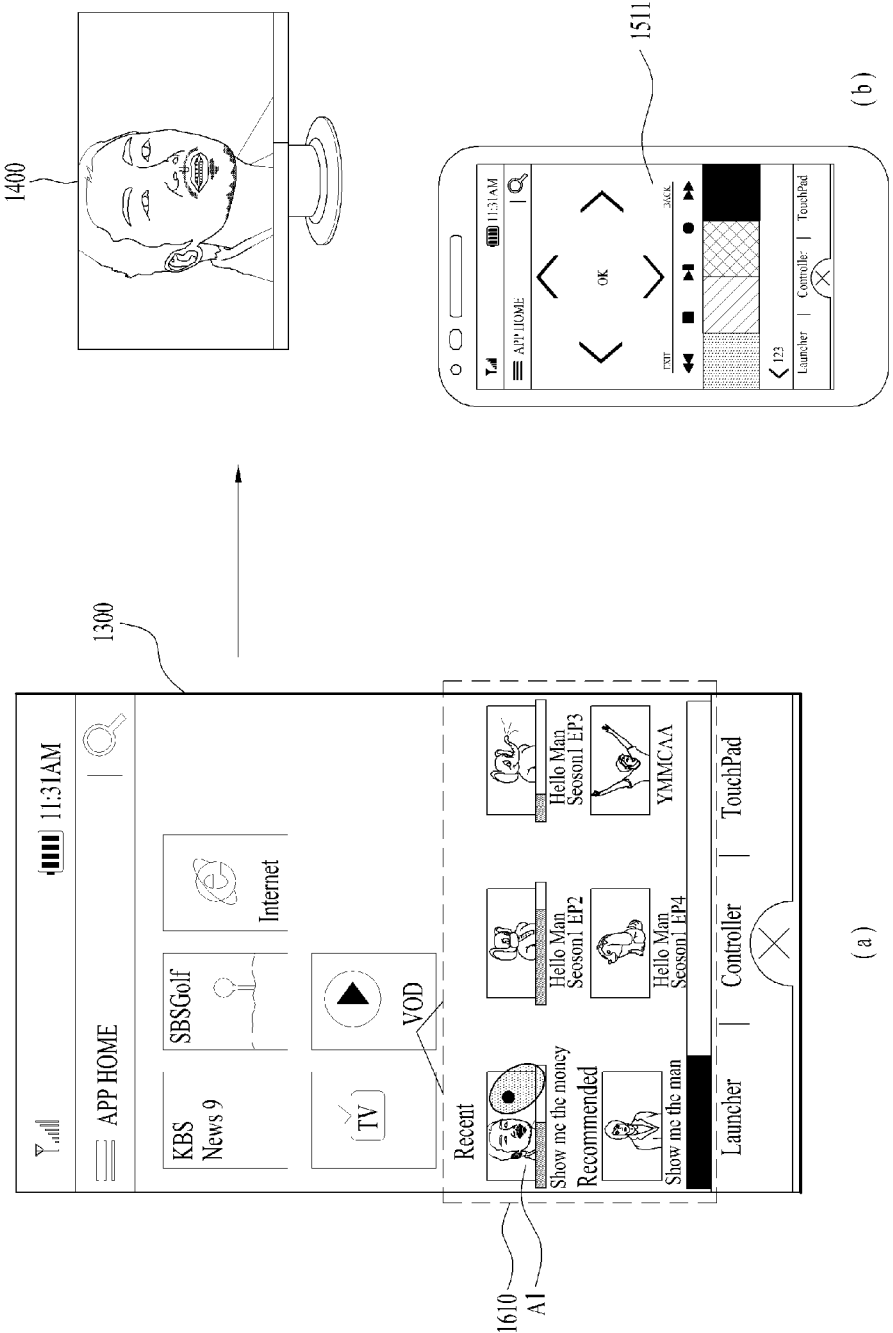
FIG. 21 and FIG. 22 are diagrams illustrating one example of a method of changing a GUI output depending on a type of a content displayed on a communication-connected preset external display device in a mobile terminal according to one embodiment of the present invention.
Figure 22:
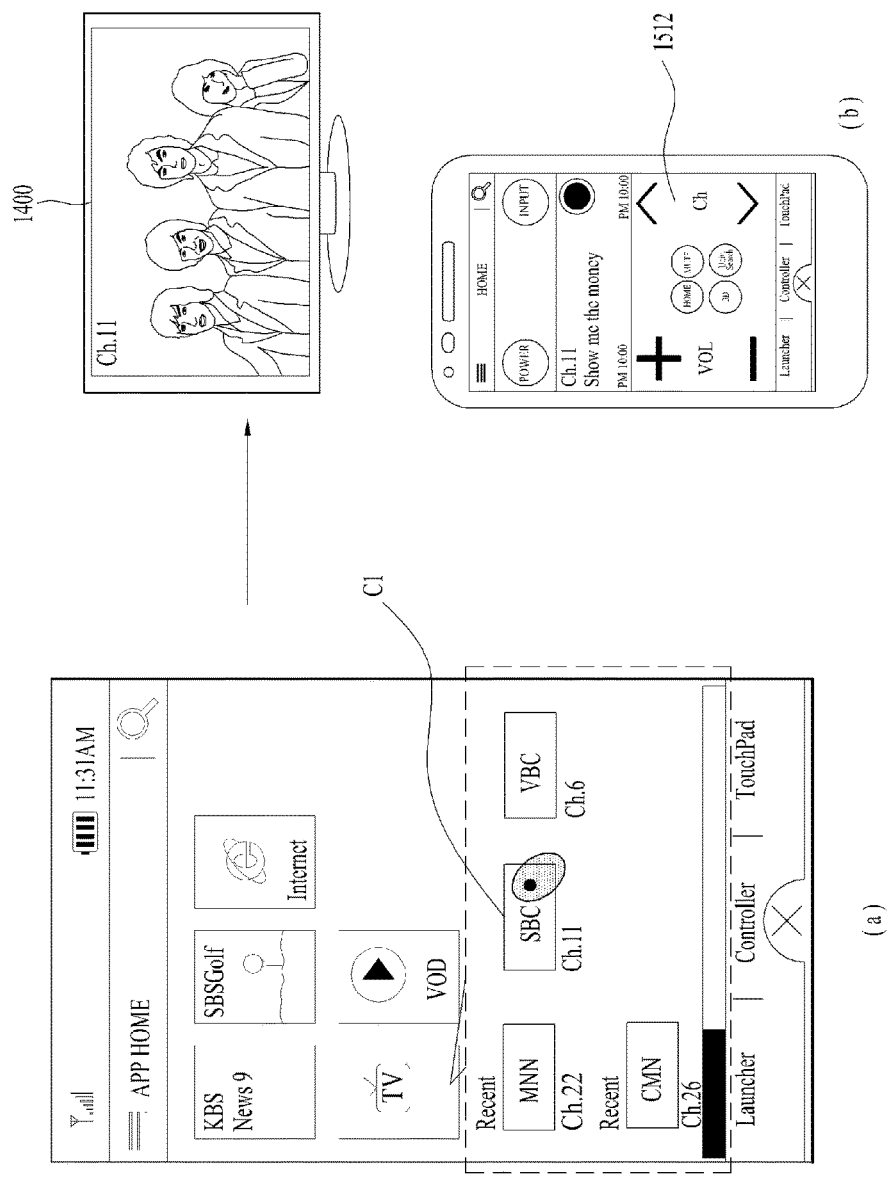

FIG. 21 and FIG. 22 are diagrams illustrating one example of a method of changing a GUI output depending on a type of a content displayed on a communication-connected preset external display device in a mobile terminal according to one embodiment of the present invention. Regarding the descriptions with reference to FIG. 21 and FIG. 22, the substance redundant with the foregoing descriptions with reference to FIGS. 14 to 20 is not mentioned again and the following description is made centering on the differences.

Referring to FIG. 21 (*a*), in response to a command for selecting a specific thumbnail image A1 included in the recent content list, it can control the communication unit 1320 to send first signal, which instructs to display a specific content corresponding to the specific thumbnail image A1, to the communication-connected preset external display device 1400.

Further, referring to FIG. 22 (*b*), a specific thumbnail image C1 of a specific channel may be included in the recent content list, and a command for instructing to switch a channel to the specific channel may be included in the first signal. In particular, in response to a command for selecting the specific thumbnail image C1 of the specific channel included in the recent content list, the controller 1340 of the mobile terminal 1300 can send a signal, which instructs to switch the channel to the specific channel, to the communication-connected preset external display device 1400.

The preset external display device 1400 having the connected communication with the mobile terminal 1300 having received the first signal can display the specific content. Further, in accordance with the transmission of the first signal, the controller 1340 of the mobile terminal 1300 can control the display unit 1330 to display a GUI (graphical user interface) configured to control the preset external display device 1400 in association with the specific content.

For instance, referring to FIG. 21 (*b*), assuming that the specific data is VOD data, the controller 1340 of the mobile terminal 1300 can control the display unit 1330 to display a GUI 1511 configured to control the VOD data. In this instance, at least one indicator related to a play of the VOD data may be included in the GUI 1511. Hence, it is advantageous in that a user can control the communication-connected preset external display device conveniently and easily using the mobile terminal 1300.

In another instance, referring to FIG. 22 (*b*), assuming that the specific content is a specific channel, the controller 1340 of the mobile terminal 1300 can control the display unit 1330 to display a GUI 1512 configured to control the specific channel. In this instance, the GUI 1512 may include an indicator related to a channel switching, an indicator related a volume control, information on a program currently broadcasted on the specific channel, an indicator related to a program recording, and the like. Besides, the displayed GUI may include a keyboard depending on a type of the specific content.

Further, according to an embodiment of the present invention, when an icon of at least one application saved in the memory of the communication-connected display device 1400 is displayed, the controller 1340 of the mobile terminal 1300 can control a specific indicator to be displayed on an icon of an application having a preferred content or an icon of an application having a recently displayed content. This is described in detail with reference to FIG. 23 as follows.

Figure 23:
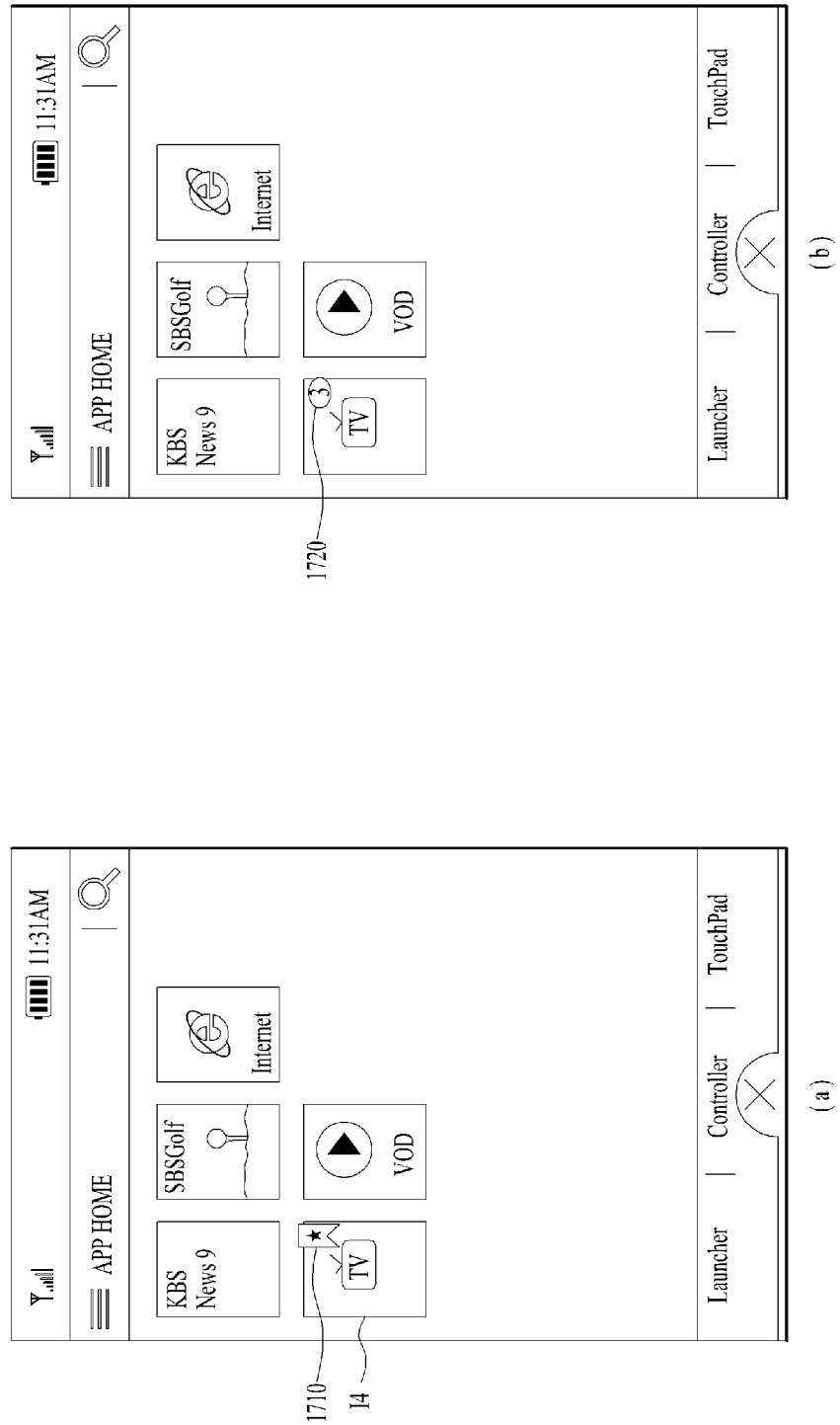
FIG. 23 is a diagram illustrating one example of a method of displaying an icon of an application having a presence of a preferred content in a mobile terminal according to one embodiment of the present invention.

FIG. 23 is a diagram illustrating one example of a method of displaying an icon of an application having a presence of a preferred content in a mobile terminal according to one embodiment of the present invention. Regarding the description with reference to FIG. 23, the substance redundant with the foregoing descriptions with reference to FIGS. 14 to 22 is not mentioned again and the following description is made centering on the differences.

Referring to FIG. 23, the memory 1310 may include second information on at least one application saved in a memory of a preset external display device having a communication connected to the mobile terminal 1300 and fourth information on at least one preferred content. In this instance, the preferred content may include a content set as a frequently viewed content that is frequently viewed by a user.

Referring to FIG. 23 (*a*), the controller 1340 can control the display unit 1330 to display first indicator 1710 on an icon I4 of an application having at least one preferred content among icons of the at least one or more applications based on the second information and the fourth information. In particular, the controller 1340 can control the first indicator 1710 to be displayed on the icon I4 of the application, on which the at least one preferred content can be run, based on at least one of the second information and the fourth information. For instance, the first indicator 1710 may include an indicator of a bookmark type. According to this, it is advantageous in that a user can intuitively recognize which icon is an icon of an application having a preferred content.

Further, according to an embodiment, the controller 1340 can control the first indicator 1710 to be displayed on the icon I4 of the applicable having a content viewed in a display device within a preset period. According to the present embodiment, the controller 1340 can display the first indicator 1710 on the icon I4 of the application on which the content viewed in the display device within the preset period can be run.

Further, referring to FIG. 23 (*b*), the controller 1340 can control the communication unit 1320 to receive fifth information on an update history of the at least one preferred content from the preset external display device 1400. The controller 1340 can control the display unit 1330 to display second indicator 1720 on an icon of an application having the preferred content related to the update history among icons of the at least one or more applications based on the fifth information. In particular, the controller 1340 can control the display unit 1330 to display the second indicator 1720 on an icon of an application on which an updated preferred content can be run. In this instance, the second indicator 1720 may contain information on the number of updated preferred contents. According to the present embodiment, it is advantageous in that a user can directly check information (e.g., information on an application capable of executing an updated preferred content, information on the number of updated preferred contents, etc.) on an updated preferred content.

Further, according to an embodiment, if the preferred content is currently broadcasted on a specific channel, the controller 1340 ends a content currently run in the communication-connected preset external display device 1400 and can send a specific signal, which performs a channel switching to display the preferred content, to the preset external display device 1400.

Further, according to one embodiment of the present invention, if the preferred content is currently broadcasted on a specific channel, the controller 1340 can control the display unit 1330 to display a message which is provided to check whether to perform a specific function in the communication-connected if the preferred content is currently broadcasted on a specific channel, the controller 1340. This is described in detail with reference to FIG. 24 as follows.

Figure 24:
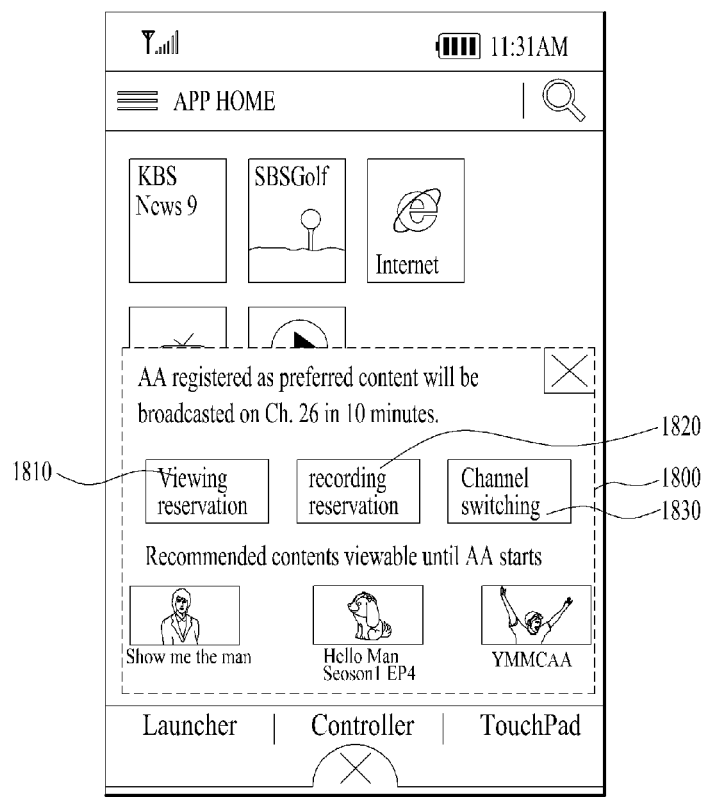
FIG. 24 is a diagram illustrating one example of a method of controlling a communication-connected preset external display device in case of a preferred content scheduled to be broadcasted on a specific channel in a mobile terminal according to one embodiment of the present invention.

FIG. 24 is a diagram illustrating one example of a method of controlling a communication-connected preset external display device in case of a preferred content scheduled to be broadcasted on a specific channel in a mobile terminal according to one embodiment of the present invention. Regarding the description with reference to FIG. 24, the substance redundant with the foregoing descriptions with reference to FIGS. 14 to 23 is not mentioned again and the following description is made centering on the differences.

According to one embodiment of the present invention, the memory 1310 may include second information on at least one application saved in a memory of a preset external display device having a communication connected to the mobile terminal 1300 and fourth information on at least one preferred content.

Referring to FIG. 24, the controller 1340 of the mobile terminal 1300 can receive fifth information, which indicates that a specific preferred content will be broadcasted on a specific channel in a preset time (e.g., 10 minutes), from the communication-connected preset external display device 1400. The controller 1340 can control the display unit 1330 to display a specific message 1800 when the fifth information is received.

The specific message 1800 may contain first indicator 1810 corresponding to a function of making a viewing reservation of the specific preferred content, second indicator 1820 corresponding to a function of making a recording reservation of the specific preferred content, third indicator 1830 corresponding to a function of switching a channel to a channel scheduled to broadcast the specific preferred content, information on a recommended content viewable prior to viewing the specific preferred content, and the like.

In the information on the recommended content viewable prior to viewing the specific preferred content, information on a title of the recommended content, a thumbnail image of the recommended content and the like can be included. Using information on at least one recommended content saved in the memory 1310, the controller 1340 may extract the information on the recommended content or may receive information on the recommended content from the preset external display device 1400.

FIG. 25 is a diagram illustrating another example of a method of controlling a specific content to be displayed on a communication-connected preset external display device using a mobile terminal according to one embodiment of the present invention.

According to one embodiment of the present invention, referring to FIG. 25, the controller 1340 of the mobile terminal 1300 can control the communication unit 1320 to receive at least one of first information on a content viewing history and second information on at least one application saved in a memory of the preset external display device 1400 from the communication-connected preset external display device 1400.

The controller 1340 can control the display unit 1330 to display an icon of the at least one application based on the second information. In response to first touch input to a specific icon among icons of the at least one or more applications, the controller 1340 can control the display unit 1330 to display at least one of a list of recent contents run on a specific application corresponding to the specific icon and a recommended content list on a prescribed region 1610 of a screen based on at least one of the first information and the second information. In this instance, the recent content list may include a thumbnail image of at least one content previously run on the specific application and third information indicating a play time of each of the at least one content. In addition, the recommended content list may include a thumbnail image of at least one recommended content.

The controller 1340 can detect a command for selecting a specific thumbnail image A1 included in the recent content list. In response to the command for selecting the specific thumbnail image A1 included in the recent content list, the controller 1340 can control the communication unit 1320 to send first signal, which instructs to display a specific content correspond to the specific thumbnail image A1 from a specific timing point, to the communication-connected preset external display device 1400. In this instance, the specific timing point may mean a last timing point at which the executing of the specific content was ended in the preset external display device 1400.

Yet, referring to FIG. 25 (*a*), while power of the communication-connected preset external display device 1400 is turned off, the controller 1340 of the mobile terminal 1300 turns on the power of the preset external display device 1400 and can control the communication unit 1320 to send the first signal to the preset external display device 1400.

For instance, if the controller 1340 recognizes that the power of the communication-connected preset external display device 1400 has been turned off, the controller 1340 can send a signal, which instructs to turn on the power of the display device 1400, using a specific sensor (e.g., IR sensor) built in the mobile terminal 1300 in response to a command for selecting the specific thumbnail image A1. Subsequently, the controller 1340 can control the communication unit 1320 to send the first signal to the preset external display device 1400 as soon as turns on the power of the display device 1400.

In another instance, first of all, the controller 1340 can detect whether the power of the communication-connected preset external display device 1400 has been turned off. If the controller 1340 of the mobile terminal 1300 detects that the power of the preset external display device 1400 has been turned off, the controller 1340 can generate second signal instructing to turn on the power of the preset external display device 1400. Subsequently, the controller 1340 can control the communication unit 1320 to send the generated second signal to the preset external display device 1400 together with the first signal.

Referring to FIG. 25 (*b*), in response to a command for selecting the specific thumbnail image A1 from a user of the mobile terminal 1300, a state of the display device 1400 can be changed from a power-off state shown in FIG. 25 (*a*) into a power-on state shown in FIG. 25 (*b*). Subsequently, the display device 1400 can display the specific content from a specific timing point in response to the received first signal as soon as turns on the power of its own.

For instance, when the display device 1400 receives a signal for turning on the power through the IR sensor of the mobile terminal 1300, the display device 1400 can turn on its power and can also display the specific content from the specific timing point by receiving the first signal. In another instance, as the display device 1400 receives both of the first signal and the second signal from the mobile terminal 1300, the display device 1400 can turns on its power and can display the specific content from the specific timing point.

In particular, while the power of the display device 1400 is turned off, if a user of the mobile terminal 1300 selects the specific thumbnail image A1, the power of the display device 1400 is turned on and the specific content can be displayed on the display device 1400 from the specific timing point.

According to the present embodiment, a user can advantageously view a desired content from a timing point of ending a previous viewing as soon as the user turns on the power of the display device 1400.

According to at least one of the embodiments of the present invention, it is advantageous in that user's viewing and control histories saved in a display device can be saved to a mobile terminal capable of controlling the display device. In addition, it is advantageous in that continuity and convenience of user's experience can be secured by facilitating user's viewing of a viewing-interrupted content by saving user's viewing and control histories saved in a display device to a mobile terminal. Moreover, it is advantageous in that a list of applications runnable in a display device can be provided using a remote controller application saved in a memory of a mobile terminal as well as a recently viewed content can be guided.

In more detail, embodiments of the present invention provide various effects and/or features. According to one embodiment of the present invention, user's viewing and control histories saved in a display device can be saved to a mobile terminal capable of controlling the display device. According to another embodiment of the present invention, continuity and convenience of user's experience can be secured by facilitating user's viewing of a viewing-interrupted content by saving user's viewing and control histories saved in a display device to a mobile terminal. According to another embodiment of the present invention, a list of applications runnable in a display device can be provided using a remote controller application saved in a memory of a mobile terminal as well as a recently viewed content can be guided.

According to another embodiment of the present invention, user's convenience can be secured by changing an execution screen of a remote controller application saved in a mobile terminal into a configuration for facilitating user's control of a display device in accordance with a type of a content currently displayed on a display device. According to further embodiment of the present invention, a display device can be controlled by providing a user-customized notification without interrupting a user in viewing a currently displayed content.

The mobile terminal and controlling method thereof disclosed in the present specification can be achieved by combination of structural elements and features of the present invention in a predetermined type. Each of the structural elements or features should be considered selectively unless specified separately. Each of the structural elements or features may be performed without being combined with other structural elements or features. Also, some structural elements and/or features may be combined with one another to constitute the embodiments of the present invention.

A mobile terminal operating method disclosed in the present specification can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations such as transmission via Internet. Further, the recording medium readable by a processor is distributed to a computer system connected to a network, whereby codes readable by the processor by distribution can be saved and executed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

The present invention relates to a mobile terminal and a method for controlling the same. Therefore, the present invention has industrial applicability.

What is claimed is:

1. A mobile terminal, comprising:
   a wireless communication processor configured to receive first information about a content viewing history of a preset external display device and second information about a plurality of applications installed on the preset external display device;
   a memory configured to store a preset application, the first information and the second information;
   a display configured to display an execution screen of the preset application; and
   a controller configured to:
   display, on the execution screen of the display, a plurality of icons of the plurality of applications corresponding to the plurality of applications installed on the preset external display device based on the second information,
   in response to a first touch input to a specific icon among the plurality of icons of the plurality of applications on the execution screen of the display, corresponding to the plurality of applications installed on the preset external display device, display a recent content list listing at least one content previously run on the preset external display device via a specific application among the plurality of applications installed on the preset external display device, the specific application corresponding to the specific icon on a prescribed region of the execution screen based on the first information and the second information, and
   in response to selection of the at least one content from the recent content list, communicate with the preset external display device to display the at least one content,
   wherein the first information includes information on an application runnable by the at least one content and at least one of: information on a play time of the at least one content, information on a series of the at least one content, and information on a channel scheduled to broadcast the at least one content,
   wherein the second information includes icon image data of the plurality of applications, information on a title of the plurality of applications, or information on content runnable in the plurality of applications,
   wherein the at least one content includes multimedia content produced from a third party broadcast system, and
   wherein the recent content list comprises a screenshot and a title of the at least one content previously run via the specific application.

2. The mobile terminal of claim 1, wherein the first touch input comprises touching the specific icon for a preset time.

3. The mobile terminal of claim 1, wherein the recent content list comprises third information indicating a play time of each of the at least one content previously run.

4. The mobile terminal of claim 1, wherein the controller is configured to further display a recommended content list based on the first information and the second information in response to the first touch input,
wherein the recommended content list comprises a thumbnail image of at least one recommended content, and
wherein in response to a second touch input for selecting a specific thumbnail image from the recommended content list, the controller is further configured to transmit a first signal to the preset external display device instructing the preset external display device to run a content corresponding to the specific thumbnail image.

5. The mobile terminal of claim 3, wherein in response to a third touch input for selecting a specific thumbnail image of a specific content from the recent content list, the controller is further configured to transmit a first signal to the preset external display device instructing the preset external display device to run the specific content from a specific timing point.

6. The mobile terminal of claim 5, wherein in response to the transmission of the first signal, the controller is further configured to display a GUI (graphical user interface) on the display unit for controlling the preset external display device in association with the specific content.

7. The mobile terminal of claim 6, wherein the controller is further configured to change the GUI depending on a type of the specific content.

8. The mobile terminal of claim 1, wherein the memory is further configured to store fourth information about at least one preferred content, and
wherein based on the second information and the fourth information, the controller is further configured to display a first indicator on an icon of an application having the at least one preferred content among the plurality of icons of the plurality of installed applications.

9. The mobile terminal of claim 8, wherein the controller is further configured to receive fifth information about an update history of the at least one preferred content from the preset external display device, and
wherein based on the fifth information, the controller is further configured to display a second indicator on an icon of an application having a preferred content related to the update history among the plurality of icons of the plurality of installed applications.

10. A method of controlling a mobile terminal, the method comprising:
displaying, via a display, an execution screen of a preset application saved in a memory of the mobile terminal;
receiving, via a wireless communication processor, first information about a content viewing history and second information about a plurality of applications installed on a preset external display device;
saving the first information and the second information to the memory;
displaying, on the execution screen of the display, a plurality of icons of the plurality of applications corresponding to the plurality of applications installed on the preset external display device based on the second information;
in response to a first touch input to a specific icon among the plurality of the icons of the plurality of applications on the execution screen of the display, corresponding to the plurality of applications installed on the preset external display device, displaying a recent content list listing at least one content previously run on the preset external display device via a specific application among the plurality of applications installed on the preset external display device, the specific application corresponding to the specific icon on a prescribed region of the execution screen based on the first information and the second information, and
in response to selection of the at least one content from the recent content list, communicating with the preset external display device to display the at least one content,
wherein the first information includes information on an application runnable by the at least one content and at least one of: information on a play time of the at least one content, information on a series of the at least one content, and information on a channel scheduled to broadcast the at least one content,
wherein the second information includes icon image data of the plurality of applications, information on a title of the plurality of applications, or information on content runnable in the plurality of applications,
wherein the at least one content includes multimedia content produced from a third party broadcast system, and
wherein the recent content list comprises a screenshot and a title of the at least one content previously run via the specific application.

11. The method of claim 10, wherein the first touch input comprises touching the specific icon for a preset time.

12. The method of claim 10, wherein the recent content list comprises third information indicating a play time of each of the at least one content previously run.

13. The method of claim 10, further comprising further displaying a recommended content list based on the first information and the second information in response to the first touch input,
wherein the recommended content list comprises a thumbnail image of at least one recommended content, and
wherein the method further comprises in response to a second touch input for selecting a specific thumbnail image from the recommended content list, transmitting a first signal to the preset external display device instructing the preset external display device to run a content corresponding to the specific thumbnail image.

14. The method of claim 12, further comprising in response to a third touch input for selecting a specific thumbnail image of a specific content from the recent content list, transmitting a first signal instructing to the preset external display device instructing to the preset external display device to run the specific content from a specific timing point.

15. The method of claim 14, further comprising in response to the transmission of the first signal, displaying a GUI (graphical user interface) for controlling the preset external display device in association with the specific content.

16. The method of claim 15, further comprising changing the GUI depending on a type of the specific content.

17. The method of claim 10, further comprising:
saving fourth information about at least one preferred content to the memory; and
based on the second information and the fourth information, displaying a first indicator on an icon of an application having the at least one preferred content among the plurality of icons of the plurality of installed applications.

18. The method of claim 17, further comprising:

receiving fifth information about an update history of the at least one preferred content from the preset external display device; and based on the fifth information, displaying a second indicator on an icon of an application having a preferred content related to the update history among the plurality of icons of the plurality of installed applications.

* * * * *